US012775194B2

(12) United States Patent
Yokota

(10) Patent No.: US 12,775,194 B2

(45) Date of Patent: Oct. 27, 2026

(54) MODULE DRIVING DEVICE

(71) Applicant: ALPS ALPINE CO., LTD., Tokyo (JP)

(72) Inventor: Junichiro Yokota, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 180 days.

(21) Appl. No.: 18/941,632

(22) Filed: Nov. 8, 2024

(65) Prior Publication Data

US 2025/0155777 A1 May 15, 2025

(30) Foreign Application Priority Data

Nov. 14, 2023 (JP) ................................ 2023-193376

(51) Int. Cl.

*G03B 5/06* (2021.01)
*G03B 17/12* (2021.01)

(52) U.S. Cl.

CPC .............. *G03B 5/06* (2013.01); *G03B 17/12* (2013.01); *G03B 2205/0076* (2013.01); *G03B 2217/007* (2013.01)

(58) Field of Classification Search

CPC . G03B 17/12; G03B 5/06; G03B 5/00; G03B 2205/00; G03B 2205/0023; G03B 2205/0053; G03B 2205/0076; G03B 2217/007; G02B 27/64; G02B 27/646; H04N 23/68; H04N 23/681; H04N 23/682

See application file for complete search history.

(56) References Cited

U.S. PATENT DOCUMENTS

2012/0038784 A1 2/2012 Irisawa et al.
2013/0076924 A1 3/2013 Wade et al.
2017/0003517 A1 1/2017 Sue et al.
2019/0018260 A1 1/2019 Minamisawa
2020/0174275 A1 6/2020 Minamisawa
2020/0314302 A1 10/2020 Minamisawa
2020/0404181 A1 12/2020 Lee et al.
2022/0174189 A1 6/2022 Kuo et al.
2023/0004065 A1* 1/2023 Osada .................. G02B 27/646
2023/0250810 A1* 8/2023 Brown .................. F03G 7/0614
359/823

FOREIGN PATENT DOCUMENTS

JP 2010-231168 10/2010
JP 2011-257507 12/2011
JP 2017-016113 1/2017
JP 2019-020502 2/2019

(Continued)

*Primary Examiner* — Ephrem Z Mebrahtu

(74) *Attorney, Agent, or Firm* — IPUSA, PLLC

(57) ABSTRACT

A module driving device includes a module holder configured to hold an optical module including a lens body and an imaging element; a connection member connected to the module holder such that the module holder is rockable about a first axial line that crosses an optical-axis direction; a fixed-side member connected to the connection member such that the connection member is rockable about a second axial line that crosses the optical-axis direction and is perpendicular to an axial line direction of the first axial line; and a driver including a plurality of shape memory alloy wires configured to move the module holder relative to the fixed-side member.

12 Claims, 20 Drawing Sheets

(56) References Cited

FOREIGN PATENT DOCUMENTS

| | | |
|---|---|---|
| JP | 2020-166019 | 10/2020 |
| JP | 2020-166179 | 10/2020 |
| JP | 2021-113848 | 8/2021 |
| JP | 2022-080850 | 5/2022 |
| JP | 2022-545875 | 11/2022 |
| JP | 2023-007868 | 1/2023 |
| KR | 10-2020-0144260 | 12/2020 |

* cited by examiner

FIG.12

| | ROTATION ABOUT X AXIS | | ROTATION ABOUT Y AXIS | | ROTATION ABOUT Z AXIS | |
|---|---|---|---|---|---|---|
| | CLOCKWISE IN FRONT VIEW | COUNTER-CLOCKWISE IN FRONT VIEW | CLOCKWISE IN RIGHT SIDE VIEW | COUNTER-CLOCKWISE IN RIGHT SIDE VIEW | CLOCKWISE IN TOP VIEW | COUNTER-CLOCKWISE IN TOP VIEW |
| FIRST WIRE SA1 | SHRINKAGE | EXTENSION | – | – | SHRINKAGE | EXTENSION |
| SECOND WIRE SA2 | EXTENSION | SHRINKAGE | – | – | EXTENSION | SHRINKAGE |
| THIRD WIRE SA3 | EXTENSION | SHRINKAGE | – | – | SHRINKAGE | EXTENSION |
| FOURTH WIRE SA4 | SHRINKAGE | EXTENSION | – | – | EXTENSION | SHRINKAGE |
| FIFTH WIRE SA5 | – | – | EXTENSION | SHRINKAGE | EXTENSION | SHRINKAGE |
| SIXTH WIRE SA6 | – | – | SHRINKAGE | EXTENSION | SHRINKAGE | EXTENSION |
| SEVENTH WIRE SA7 | – | – | SHRINKAGE | EXTENSION | EXTENSION | SHRINKAGE |
| EIGHTH WIRE SA8 | – | – | EXTENSION | SHRINKAGE | SHRINKAGE | EXTENSION |

MODULE DRIVING DEVICE

CROSS-REFERENCE TO RELATED APPLICATIONS

The present application is based on and claims priority to Japanese Patent Application No. 2023-193376 filed on Nov. 14, 2023, the entire contents of which are hereby incorporated by reference.

BACKGROUND

1. Field of the Invention

The present disclosure relates to a module driving device.

2. Description of the Related Art

A camera module driving device has been known in Japanese Laid-Open Patent Application No. 2023-007868.

SUMMARY

A module driving device according to an embodiment of the present disclosure includes: a module holder configured to hold an optical module including a lens body and an imaging element; a connection member connected to the module holder such that the module holder is rockable about a first axial line that crosses a direction of an optical axis (an optical-axis direction); a fixed-side member connected to the connection member such that the connection member is rockable about a second axial line that crosses the direction of the optical axis and is perpendicular to an axial line direction of the first axial line; and a driver including a plurality of shape memory alloy wires configured to move the module holder relative to the fixed-side member. The module driving device includes a first magnetic member, a second magnetic member, a third magnetic member, and a fourth magnetic member. A first movable portion including the module holder includes the third magnetic member. At least one of a second movable portion or the fixed-side member includes the fourth magnetic member, the second movable portion including the connection member. At least one of the third magnetic member or the fourth magnetic member is formed of a magnet. Due to a magnetic force acting between the third magnetic member and the fourth magnetic member, a posture of the module holder in an initial state in which the driver is not driven is maintained. A movable-side member includes the first magnetic member, the movable-side member including the first movable portion and the second movable portion. The fixed-side member includes the second magnetic member. At least one of the first magnetic member or the second magnetic member is formed of a magnet. Due to a magnetic force acting between the first magnetic member and the second magnetic member, a posture of the connection member in the initial state is maintained.

BRIEF DESCRIPTION OF THE DRAWINGS

FIG. 12 is a table illustrating extension and shrinkage of the shape memory alloy wires for achieving movement of the module holder;

DETAILED DESCRIPTION OF THE DISCLOSURE

The device disclosed in Japanese Laid-Open Patent Application No. 2023-007868 is configured to use shape memory alloy wires to rock a camera module held by a movable-side member.

However, according to the above-described device, even if shooting is performed in a state of not rocking the camera module, it is necessary to continue to cause a current to flow through the shape memory alloy wires in order to maintain the state of not rocking the camera module. Therefore, there is a risk that power consumption increases when shooting takes a long time, such as shooting of motion pictures and the like.

Therefore, it is desirable to provide a module driving device that can reduce the power consumption.

Figure 1:
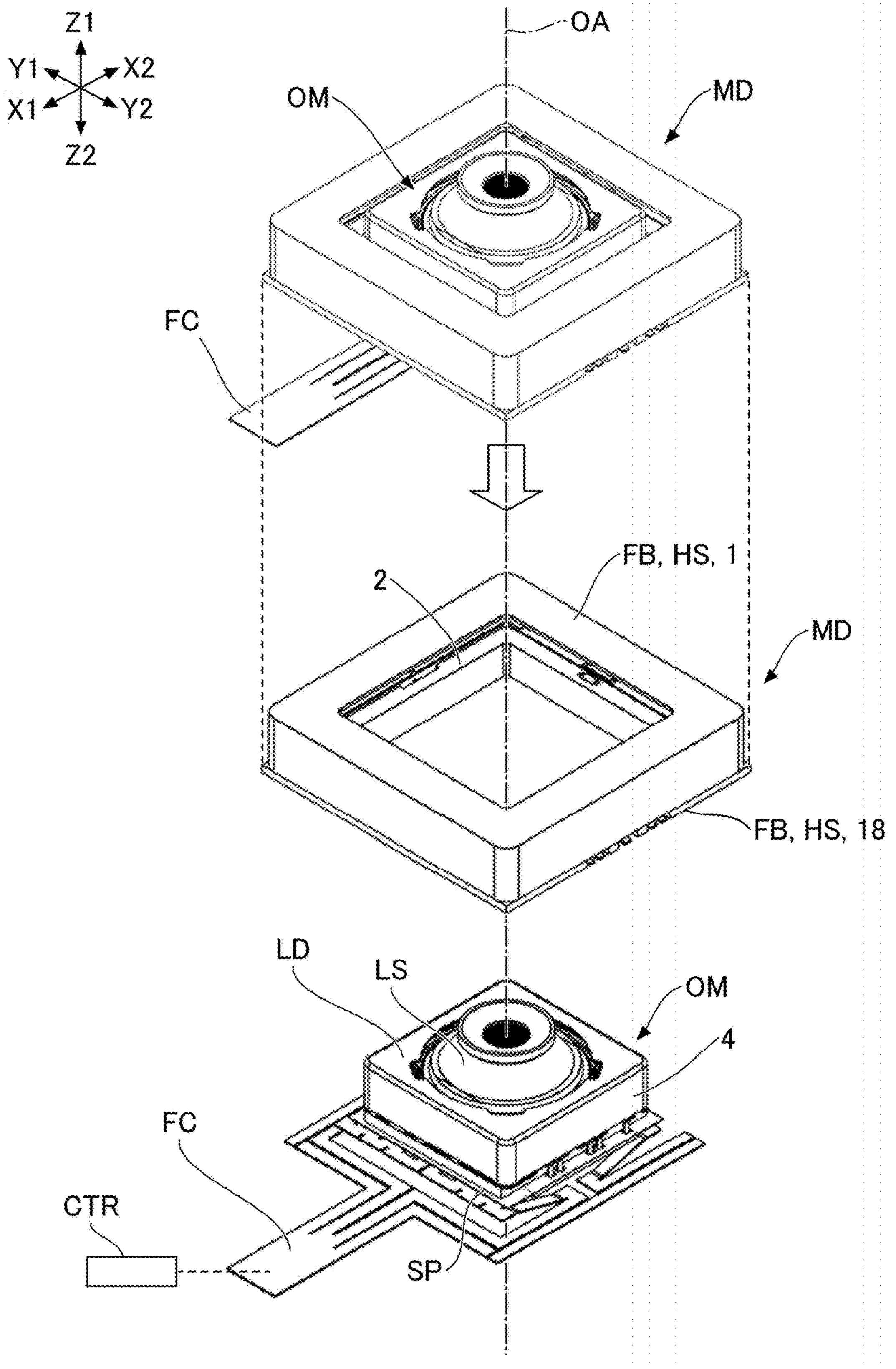
FIG. 1 is a perspective view of an optical module and a module driving device.
Figure 2:
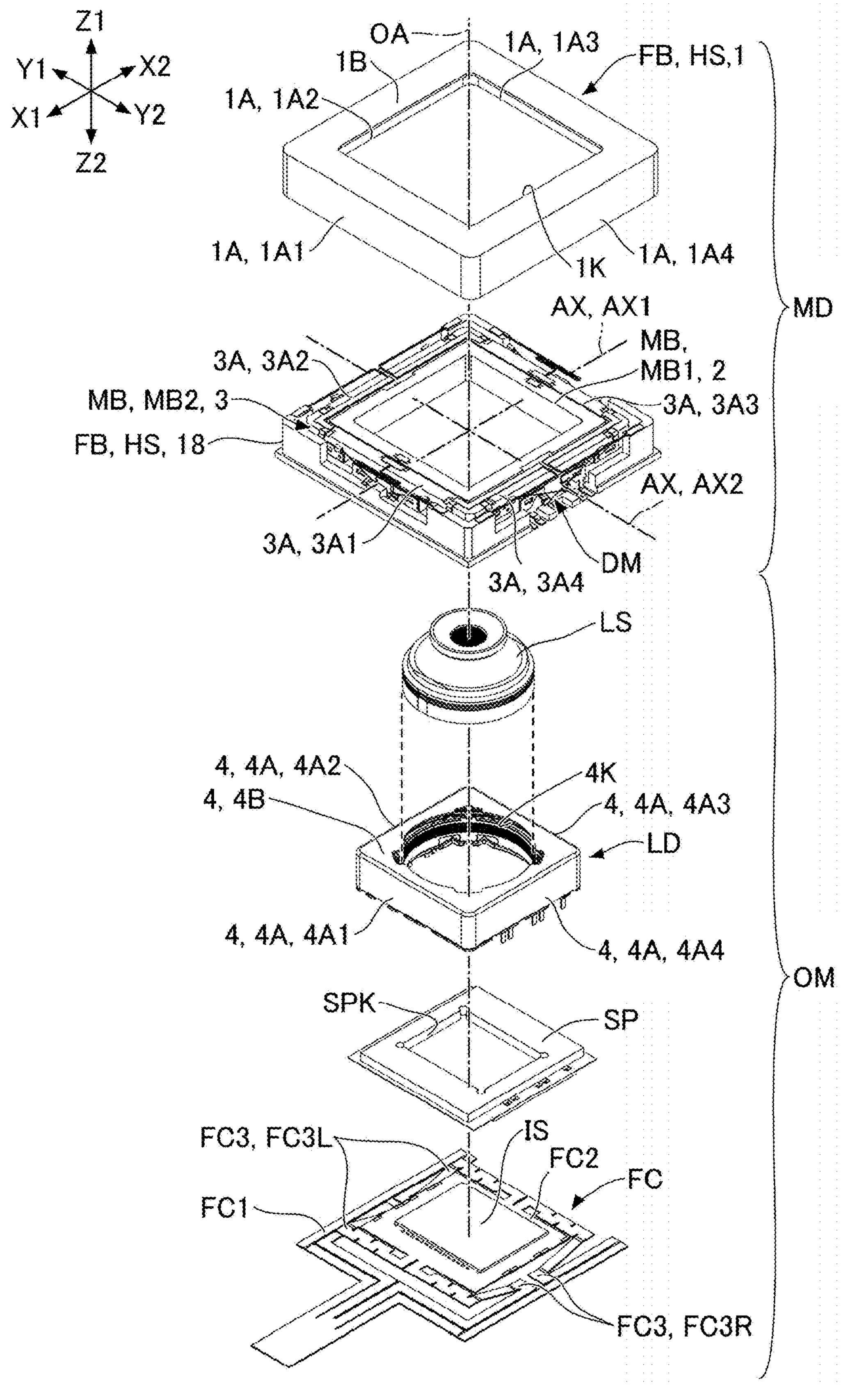
FIG. 2 is an exploded perspective view of the optical module and the module driving device.
Figure 3:
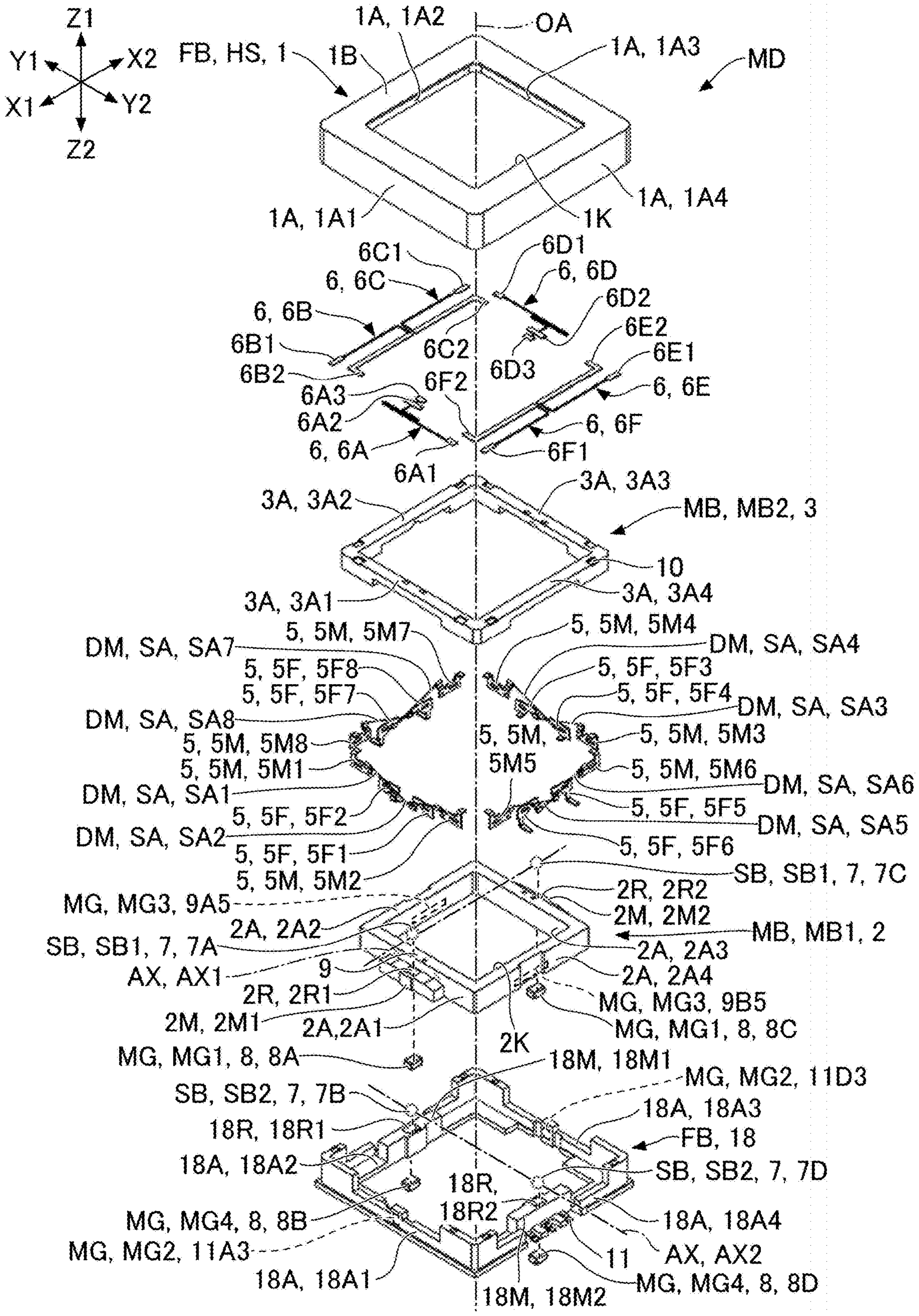
FIG. 3 is a detailed exploded perspective view of the module driving device.

In the following, a module driving device MD according to an embodiment of the present disclosure will be described with reference to the drawings. The module driving device MD is configured to tilt an optical module OM. FIG. 1 is a perspective view of the optical module OM and the module driving device MD. Specifically, the upper view (above the block arrow) in FIG. 1 is a perspective view of the module driving device MD in a state in which the optical module OM is attached, and the lower view (below the block arrow) in FIG. 1 is a perspective view of the module driving device MD in a state in which the optical module OM is removed. FIG. 2 is an exploded perspective view of the optical module OM and the module driving device MD. FIG. 3 is a detailed exploded perspective view of the module driving device MD.

In FIGS. 1, 2, and 3, X1 denotes one direction of an X axis forming a three-dimensional orthogonal coordinate system, and X2 denotes the other direction of the X axis. Y1 denotes one direction of a Y axis forming the three-dimensional orthogonal coordinate system, and Y2 denotes the other direction of the Y axis. Similarly, Z1 denotes one direction of a Z axis forming the three-dimensional orthogonal coordinate system, and Z2 denotes the other direction of the Z axis. In FIGS. 1, 2, and 3, an X1 side of the module driving device MD corresponds to a front side (front surface side) of the module driving device MD, and an X2 side of the module driving device MD corresponds to a rear side (rear surface side) of the module driving device MD. A Y1 side of the module driving device MD corresponds to a right side of the module driving device MD, and a Y2 side of the module driving device MD corresponds to a left side of the module driving device MD. A Z1 side of the module driving device MD corresponds to an upper side (subject side) of the module driving device MD, and a Z2 side of the module driving device MD corresponds to a lower side (imaging element side) of the module driving device MD. The same applies in the other drawings.

The optical module OM is a module including an optical element driving device configured to drive an optical element. In the illustrated example, the optical module OM includes a lens driving device LD, which is an example of the optical element driving device, configured to drive a lens body LS, which is an example of the optical element. The lens body LS is, for example, a cylindrical lens barrel including at least one lens, and is configured such that a central axial line of the lens body LS is along an optical axis OA.

Specifically, as illustrated in FIG. 2, the optical module OM includes the lens body LS, the lens driving device LD, an imaging element IS, a spacer SP, and a substrate FC.

The lens driving device LD is configured to move the lens body LS along the optical-axis direction (Z-axis direction) by utilizing the shape memory alloy wires. The optical-axis direction includes an axial line direction of the optical axis OA and a direction parallel to the axial line direction of the optical axis OA. The lens driving device LD is configured to move the lens body LS along directions (X-axis direction and Y-axis direction) perpendicular to the optical-axis direction by utilizing the shape memory alloy wires. In the illustrated example, the lens driving device LD is configured to move the lens body LS by utilizing the shape memory alloy wires. However, the lens driving device LD may be configured to move the lens body by utilizing a member or mechanism other than the shape memory alloy wires, such as a voice coil motor, a piezoelectric element, or the like.

A movable-side cover member 4 is configured to function as a housing that covers the members forming the lens driving device LD. In the illustrated example, the movable-side cover member 4 is formed of a non-magnetic metal, such as austenitic stainless steel or the like. However, the movable-side cover member 4 may be formed of a magnetic metal.

Specifically, as illustrated in FIG. 2, the movable-side cover member 4 is a bottomless box-shaped member and has an outer shape of a substantially rectangular parallelepiped. Also, the movable-side cover member 4 includes: a side plate 4A that is rectangular and cylindrical; and an upper plate 4B that is provided so as to be continuous with an upper end (Z1-side end) of the side plate 4A and is rectangular and flat. A circular opening 4K is formed at the center of the upper plate 4B. The side plate 4A includes a first side plate 4A1 to a fourth side plate 4A4. The first side plate 4A1 and the third side plate 4A3 face each other, and the second side plate 4A2 and the fourth side plate 4A4 face each other. The first side plate 4A1 and the third side plate 4A3 extend perpendicular to the second side plate 4A2 and the fourth side plate 4A4.

The spacer SP is configured to house the imaging element IS. In the illustrated example, the spacer SP is a substantially rectangular frame formed of a synthetic resin, and the upper surface of the frame is adhesively bonded to the lower surface of the lens driving device LD. A rectangular opening SPK for exposure of the imaging element IS is formed in the spacer SP. An unillustrated upwardly recessed portion is formed at the lower surface of the spacer SP enclosing the opening SPK, and the imaging element IS is disposed in the recessed portion. In the illustrated example, the imaging element IS and the spacer SP are not in contact with each other.

The substrate FC is a member configured to achieve electrical connection between each of the module driving device MD and lens driving device LD and a device located outward of the module driving device MD, such as a controller CTR (FIG. 1) and the like. In the illustrated example, the substrate FC is a flexible printed circuit board, and includes: an outer portion FC1 fixed to the module driving device MD; an inner portion FC2 fixed to the spacer SP; and a connection portion FC3 connecting the outer portion FC1 and the inner portion FC2. The connection portion FC3 includes a left connection portion FC3L and a right connection portion FC3R. The module driving device MD is fixed to another unillustrated external substrate that is located farther outward of the outer portion FC1. The other external substrate is connected to the outer portion FC1 of the substrate FC. The imaging element IS is mounted on the inner portion FC2. The spacer SP is disposed between the inner portion FC2 and the lens driving device LD so as to ensure a distance between the imaging element IS and the lens driving device LD.

As illustrated in FIGS. 1 and 2, the module driving device MD includes a cover member 1 that is a part of a fixed-side member FB. The cover member 1 is configured to function as a housing HS that covers the members forming the module driving device MD. In the illustrated example, the cover member 1 is formed of a non-magnetic metal, such as austenitic stainless steel or the like. However, the cover member 1 may be formed of a magnetic metal.

Specifically, as illustrated in FIG. 2, the cover member 1 is a bottomless box-shaped member and has an outer shape of a substantially rectangular parallelepiped. Also, the cover member 1 includes: a side plate 1A that is rectangular and cylindrical; and an upper plate 1B that is provided so as to be continuous with an upper end (Z1-side end) of the side plate 1A and is rectangular and flat. A rectangular opening 1K is formed at the center of the upper plate 1B. The side plate 1A includes a first side plate 1A1 to a fourth side plate 1A4. The first side plate 1A1 and the third side plate 1A3 face each other, and the second side plate 1A2 and the fourth side plate 1A4 face each other. The first side plate 1A1 and the third side plate 1A3 extend perpendicular to the second side plate 1A2 and the fourth side plate 1A4.

As illustrated in FIG. 3, the cover member 1 houses a module holder 2, a connection member 3, a metal member 5, a flexible metal member 6, a spherical body 7, a magnet 8, an inner conductive member 9, a central conductive member 10, an outer conductive member 11, a portion of a base member 18, shape memory alloy wires SA, and the like. A first movable portion MB1 including the module holder 2 and a second movable portion MB2 including the connection member 3 form a movable-side member MB, and the cover member 1 and the base member 18 form a fixed-side member FB. As illustrated in FIG. 1, the cover member 1 is adhesively bonded to the base member 18.

The module holder 2 is a member configured to hold the optical module OM, and is formed through injection molding of a synthetic resin, such as a liquid crystal polymer (LCP) or the like. In the illustrated example, the module holder 2 is a member in the form of a rectangular frame as illustrated in FIG. 3, and includes a frame 2A and a support-mounting portion 2M that projects outward of the frame 2A. The frame 2A includes a first side portion 2A1 to a fourth side portion 2A4. The first side portion 2A1 and the third side portion 2A3 face each other, and the second side portion 2A2 and the fourth side portion 2A4 face each other. The first side portion 2A1 and the third side portion 2A3 extend perpendicular to the second side portion 2A2 and the fourth side portion 2A4. In the illustrated example, the outer peripheral surface of the side plate 4A of the movable-side cover member 4 of the optical module OM is configured to be adhesively bonded to the inner peripheral surface of the frame 2A of the module holder 2. The support-mounting portion 2M includes a first support-mounting portion 2M1 projecting forward of the first side portion 2A1, and a second support-mounting portion 2M2 projecting rearward of the third side portion 2A3.

The connection member 3 is a member configured to connect the module holder 2 and the fixed-side member FB, and is formed through injection molding of a synthetic resin, such as a liquid crystal polymer (LCP) or the like. In the illustrated example, the connection member 3 is a member in the form of a rectangular frame disposed inward of the base member 18 and outward of the module holder 2, and includes a frame 3A, as illustrated in FIG. 2. The frame 3A includes: a first side portion 3A1 and a third side portion 3A3 that are apart from each other in the axial line direction of a first axial line AX1 that is one axis AX and extend in the axial line direction of a second axial line AX2 that is the other axial line AX; and a second side portion 3A2 and a fourth side portion 3A4 that are apart from each other in the axial line direction of the second axial line AX2 and extend in the axial line direction of the first axial line AX1.

The connection member 3 is connected to the module holder 2 via two of the four spherical bodies 7 (first support SB1) and is connected to the base member 18 via the remaining two of the four spherical bodies 7 (second support SB2).

The spherical body 7 is an example of a support SB configured to support the connection member 3. In the illustrated example, the spherical body 7 includes a first spherical body 7A, a second spherical body 7B, a third spherical body 7C, and a fourth spherical body 7D. The first spherical body 7A and the third spherical body 7C form the first support SB1, and the second spherical body 7B and the fourth spherical body 7D form the second support SB2. In the illustrated example, the spherical body 7 is a member formed of a magnetic metal, such as ferritic stainless steel, iron, or the like. However, the spherical body 7 may be formed of a non-metallic material, such as a ceramic or the like. The spherical body 7 is desirably formed of a magnetic material, such as a magnetic metal or the like, but may be formed of a non-magnetic material. The spherical body 7 is adhesively fixed to the connection member 3, but may be fixed to the connection member 3 by any other method, such as embedment or the like. For example, the spherical body 7 formed of a metal may be welded to a metal embedded in the connection member 3 through insert molding. The support SB may have a shape other than a spherical shape, such as a semi-spherical shape, a semi-cylindrical shape, or the like, as long as the lower surface of the support SB is formed as a projecting curved surface.

In the illustrated example, the first axial line AX1 is disposed so as to pass through the centers of the first spherical body 7A and the third spherical body 7C, and the second axial line AX2 is disposed so as to pass through the centers of the second spherical body 7B and the fourth spherical body 7D.

The magnet 8 is an example of a magnetic member MG used for maintaining the posture of the movable-side member MB. In the illustrated example, the magnet 8 includes a first magnet 8A, a second magnet 8B, a third magnet 8C, and a fourth magnet 8D. The first magnet 8A and the third magnet 8C fixed to the module holder 2 form a first magnetic member MG1, and the second magnet 8B and the fourth magnet 8D fixed to the base member 18 form a fourth magnetic member MG4. In the illustrated example, each of the first magnet 8A to the fourth magnet 8D is a permanent magnet that is bipolar in the vertical direction (Z-axis direction).

A driver DM includes the shape memory alloy wires SA that are an example of a shape memory actuator. In the illustrated example, the shape memory alloy wires SA include a first wire SA1 to an eighth wire SA8, as illustrated in FIG. 3. In response to flowing of a current, the shape memory alloy wires SA increase in temperature and shrink as a result of the increase in temperature. The driver DM can rock the optical module OM by the action of shrinkage of the shape memory alloy wires SA.

The base member 18 is formed through injection molding of a synthetic resin, such as a liquid crystal polymer (LCP) or the like. In the illustrated example, the base member 18 is a substantially rectangular frame, and includes a frame 18A and a support-mounting portion 18M projecting upward of the frame 18A, as illustrated in FIG. 3. The frame 18A includes a first side portion 18A1 to a fourth side portion 18A4. The first side portion 18A1 and the third side portion 18A3 face each other, and the second side portion 18A2 and the fourth side portion 18A4 face each other. The first side portion 18A1 and the third side portion 18A3 extend perpendicular to the second side portion 18A2 and the fourth side portion 18A4. The support-mounting portion 18M includes a first support-mounting portion 18M1 projecting upward from the second side portion 18A2, and a second support-mounting portion 18M2 projecting upward from the fourth side portion 18A4. The base member 18 forms the housing HS together with the cover member 1.

The flexible metal member 6 is formed such that the fixed-side member FB (the base member 18) can be connected to the movable-side member MB (the module holder 2 and the connection member 3). In the illustrated example, the flexible metal member 6 is a conductive connection member that connects the movable-side member MB and the fixed-side member FB. The flexible metal member 6 is formed, for example, of a metal plate formed mainly of a copper alloy, a titanium-copper alloy (titanium-copper), a copper-nickel alloy (nickel-tin-copper), or the like.

Specifically, the flexible metal member 6 includes a first flexible metal member 6A, a second flexible metal member 6B, a third flexible metal member 6C, a fourth flexible metal member 6D, a fifth flexible metal member 6E, and a sixth flexible metal member 6F. The first flexible metal member 6A includes a first portion 6A1 fixed to the base member 18, a second portion 6A2 fixed to the connection member 3, and a third portion 6A3 fixed to the module holder 2. The first portion 6A1 and the second portion 6A2 are connected by an elastic deformation portion that is elastically deformable. The second portion 6A2 and the third portion 6A3 are connected by an elastic deformation portion that is elastically deformable. The second flexible metal member 6B includes a first portion 6B1 fixed to the base member 18, and a second portion 6B2 fixed to the connection member 3. The first portion 6B1 and the second portion 6B2 are connected by an elastic deformation portion that is elastically deformable. The third flexible metal member 6C includes a first portion 6C1 fixed to the base member 18 and a second portion 602 fixed to the connection member 3. The first portion 6C1 and the second portion 6C2 are connected by an elastic deformation portion that is elastically deformable. The fourth flexible metal member 6D includes a first portion 6D1 fixed to the base member 18, a second portion 6D2 fixed to the connection member 3, and a third portion 6D3 fixed to the module holder 2. The first portion 6D1 and the second portion 6D2 are connected by an elastic deformation portion that is elastically deformable. The second portion 6D2 and the third portion 6D3 are connected by an elastic deformation portion that is elastically deformable. The fifth flexible metal member 6E includes a first portion 6E1 fixed to the base member 18 and a second portion 6E2 fixed to the connection member 3. The first portion 6E1 and the second portion 6E2 are connected by an elastic deformation portion that is elastically deformable. The sixth flexible metal member 6F includes a first portion 6F1 fixed to the base member 18 and a second portion 6F2 fixed to the connection member 3. The first portion 6F1 and the second portion 6F2 are connected by an elastic deformation portion that is elastically deformable. Bonding of the flexible metal member 6 to each of the module holder 2, the connection member 3, and the base member 18 is achieved by welding the flexible metal member 6 to a metal member that is embedded in or fixed to each of the module holder 2, the connection member 3, and the base member 18. However, bonding of the flexible metal member 6 to each of the module holder 2, the connection member 3, and the base member 18 may be achieved by another means, such as an adhesive, caulking, or the like. Alternatively, bonding of the flexible metal member 6 to each of the module holder 2, the connection member 3, and the base member 18 may be achieved by a combination of two or more bonding means.

The metal member 5 is a member to which the ends of the shape memory alloy wires SA are fixed. In the illustrated example, the metal member 5 is a member formed of a non-magnetic metal, such as phosphor bronze or the like, and includes a proximal metal member 5F and a distal metal member 5M. The proximal metal member 5F is formed to be fixed at a position close to the axial line AX, and the distal metal member 5M is formed to be fixed at a position far from the axial line AX.

More specifically, the proximal metal member 5F is also referred to as a proximal terminal plate, and includes a first proximal metal member 5F1 to an eighth proximal metal member 5F8. The distal metal member 5M is also referred to as a distal terminal plate, and includes a first distal metal member 5M1 to an eighth distal metal member 5M8. The first proximal metal member 5F1 to the fourth proximal metal member 5F4 are fixed at positions close to the first axial line AX1, and the first distal metal member 5M1 to the fourth distal metal member 5M4 are fixed at positions far from the first axial line AX1. The fifth proximal metal member 5F5 to the eighth proximal metal member 5F8 are fixed at positions close to the second axial line AX2, and the fifth distal metal member 5M5 to the eighth distal metal member 5M8 are fixed at positions far from the second axial line AX2.

One end of each of the first wire SA1 to the eighth wire SA8 is fixed to the proximal metal member 5F through crimping, welding, or the like. The other end of each of the first wire SA1 to the eighth wire SA8 is fixed to the distal metal member 5M through crimping, welding, or the like. In response to flowing of a current, each of the first wire SA1 to the eighth wire SA8 shrinks and becomes formed in a straight line along the axial line AX in a plan view that is along the optical-axis direction, thereby enabling rocking of the optical module OM relative to the fixed-side member FB. In the illustrated example, one end (lower end) of each of the first wire SA1 to the eighth wire SA8 is bonded at a position close to the axial line AX, and the other end (upper end) of each of the first wire SA1 to the eighth wire SA8 is bonded at a position far from the axial line AX. However, one end (lower end) of each of the first wire SA1 to the eighth wire SA8 may be bonded at a position far from the axial line AX, and the other end (upper end) of each of the first wire SA1 to the eighth wire SA8 may be bonded at a position close to the axial line AX.

The inner conductive member 9, the central conductive member 10, and the outer conductive member 11 are members that are provided so as to cause a current to flow through the shape memory alloy wires SA. In the illustrated example, the inner conductive member 9 is embedded in the module holder 2 through insert molding, the central conductive member 10 is embedded in the connection member 3 through insert molding, and the outer conductive member 11 is embedded in the base member 18 through insert molding. That is, in a plan view, the inner conductive member 9 is located inward of the central conductive member 10, and the outer conductive member 11 is located outward of the central conductive member 10.

Figure 4:
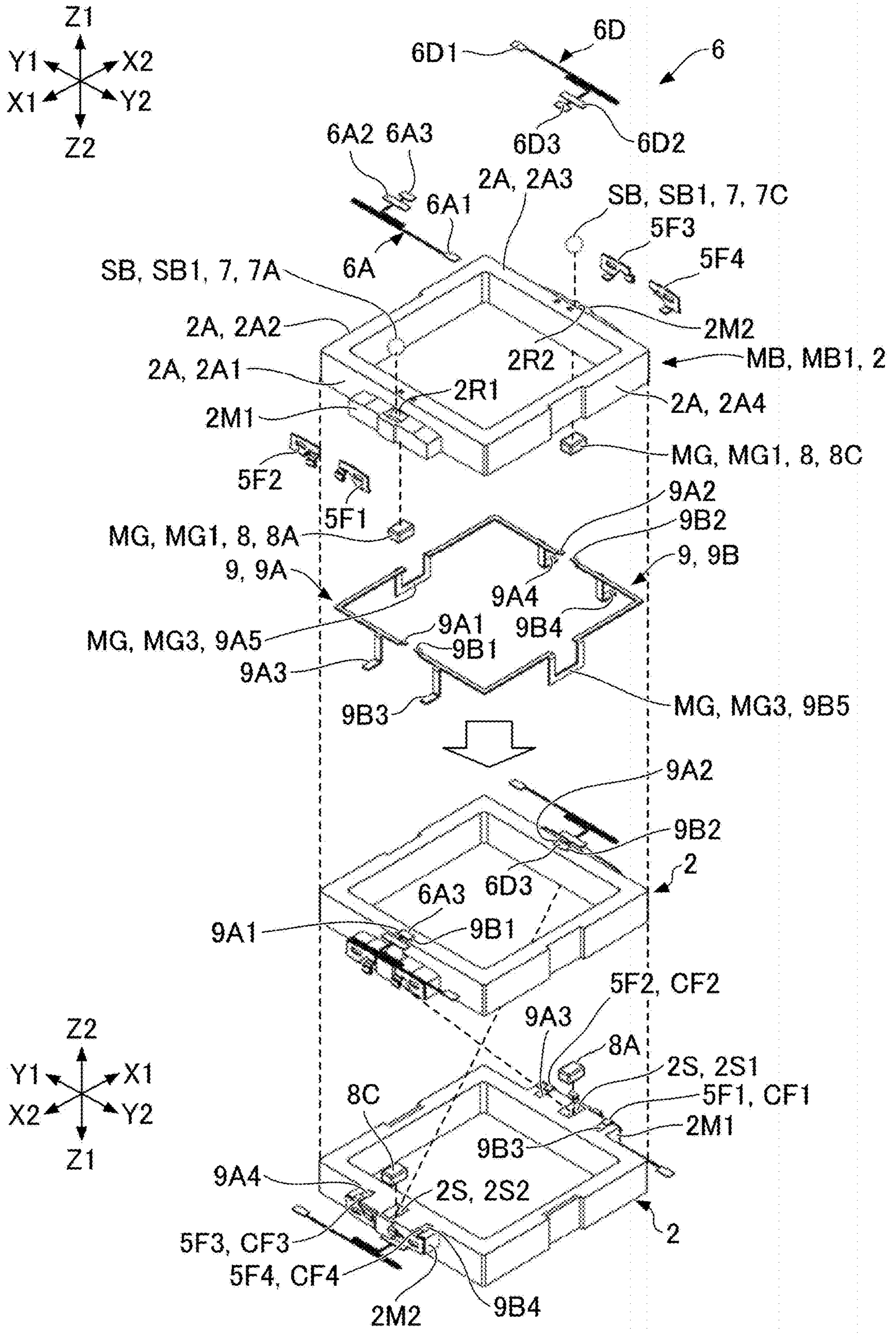
FIG. 4 is a perspective view of a module holder, a proximal metal member, a flexible metal member, a spherical body, a magnet, and an inner conductive member.

Next, the positional relationship between the module holder 2 and each of the proximal metal member 5F, the flexible metal member 6, the spherical body 7, the magnet 8, and the inner conductive member 9 will be described with reference to FIG. 4. FIG. 4 is a perspective view of the module holder 2, the proximal metal member 5F, the flexible metal member 6, the spherical body 7, the magnet 8, and the inner conductive member 9. Specifically, the upper view (above the block arrow) in FIG. 4 is a perspective view of the module holder 2, the proximal metal member 5F, the flexible metal member 6, the spherical body 7, the magnet 8, and the inner conductive member 9 in a state in which they are separated from each other. The central view (below the block arrow) in FIG. 4 is an upper perspective view of the module holder 2 to which the proximal metal member 5F, the flexible metal member 6, the spherical body 7, and the magnet 8 are attached and in which the inner conductive member 9 is embedded. The lower view in FIG. 4 is a lower perspective view of the module holder 2 to which the proximal metal member 5F, the flexible metal member 6, and the spherical body 7 are attached and in which the inner conductive member 9 is embedded. In the lower view in FIG. 4, the magnet 8 is removed from the module holder 2 for ease of understanding of the description.

The inner conductive member 9 is formed of a magnetic metal, such as ferritic stainless steel, iron, or the like. In the illustrated example, the inner conductive member 9 includes a first inner conductive member 9A and a second inner conductive member 9B. The first inner conductive member 9A includes a first portion 9A1 exposed to the upper surface of the first side portion 2A1 of the module holder 2, a second portion 9A2 exposed to the upper surface of the third side portion 2A3 of the module holder 2, a third portion 9A3 exposed to the lower surface of the first support-mounting portion 2M1 of the module holder 2, a fourth portion 9A4 exposed to the lower surface of the second support-mounting portion 2M2 of the module holder 2, and a fifth portion 9A5 forming a third magnetic member MG3 of the magnetic member MG. Similarly, the second inner conductive member 9B includes a first portion 9B1 exposed to the upper surface of the first side portion 2A1 of the module holder 2, a second portion 9B2 exposed to the upper surface of the third side portion 2A3 of the module holder 2, a third portion 9B3 exposed to the lower surface of the first support-mounting portion 2M1 of the module holder 2, a fourth portion 9B4 exposed to the lower surface of the second support-mounting portion 2M2 of the module holder 2, and a fifth portion 9B5 forming the third magnetic member MG3 of the magnetic member MG.

The first proximal metal member 5F1 and the second proximal metal member 5F2 are bonded to the outer surface (front surface) of the first support-mounting portion 2M1 of the module holder 2 by means of an adhesive, caulking, or the like. Similarly, the third proximal metal member 5F3 and the fourth proximal metal member 5F4 are bonded to the outer surface (rear surface) of the second support-mounting portion 2M2 of the module holder 2 by means of an adhesive, caulking, or the like.

The first proximal metal member 5F1 includes a first fixed portion CF1 that is overlapped with and bonded to the third portion 9B3 of the second inner conductive member 9B at the lower surface of the first support-mounting portion 2M1. The first fixed portion CF1 is formed by bending the lower portion of the first proximal metal member 5F1 in an L shape. The same applies to a second fixed portion CF2 of the second proximal metal member 5F2 that is overlapped with and bonded to the third portion 9A3 of the first inner conductive member 9A, a third fixed portion CF3 of the third proximal metal member 5F3 that is overlapped with and bonded to the fourth portion 9A4 of the first inner conductive member 9A, and a fourth fixed portion CF4 of the fourth proximal metal member 5F4 that is overlapped with and bonded to the fourth portion 9B4 of the second inner conductive member 9B.

The third portion 6A3 of the first flexible metal member 6A is overlapped with and bonded to the first portion 9A1 of the first inner conductive member 9A and the first portion 9B1 of the second inner conductive member 9B at the upper surface of the first side portion 2A1 of the module holder 2.

Similarly, the third portion 6D3 of the fourth flexible metal member 6D is overlapped with and bonded to the second portion 9A2 of the first inner conductive member 9A and the second portion 9B2 of the second inner conductive member 9B at the upper surface of the third side portion 2A3 of the module holder 2.

Of the four spherical bodies 7, the first spherical body 7A and the third spherical body 7C forming the first support SB1 are each housed in a recess 2R formed at the upper surface of the support-mounting portion 2M of the module holder 2. In the illustrated example, the lower portion of the first spherical body 7A is slidably housed in a first recess 2R1 formed at the upper surface of the first support-mounting portion 2M1, and the lower portion of the third spherical body 7C is slidably housed in a second recess 2R2 formed at the upper surface of the second support-mounting portion 2M2.

Of the four magnets 8, the first magnet 8A and the third magnet 8C forming the first magnetic member MG1 are each housed in and fixed to a magnet-housing portion 2S formed at the lower surface of the support-mounting portion 2M of the module holder 2. In the illustrated example, the first magnet 8A is housed in and adhesively fixed to a first magnet-housing portion 2S1 formed at the lower surface of the first support-mounting portion 2M1, and the third magnet 8C is housed in and adhesively fixed to a second magnet-housing portion 22 formed at the lower surface of the second support-mounting portion 2M2.

Figure 5:
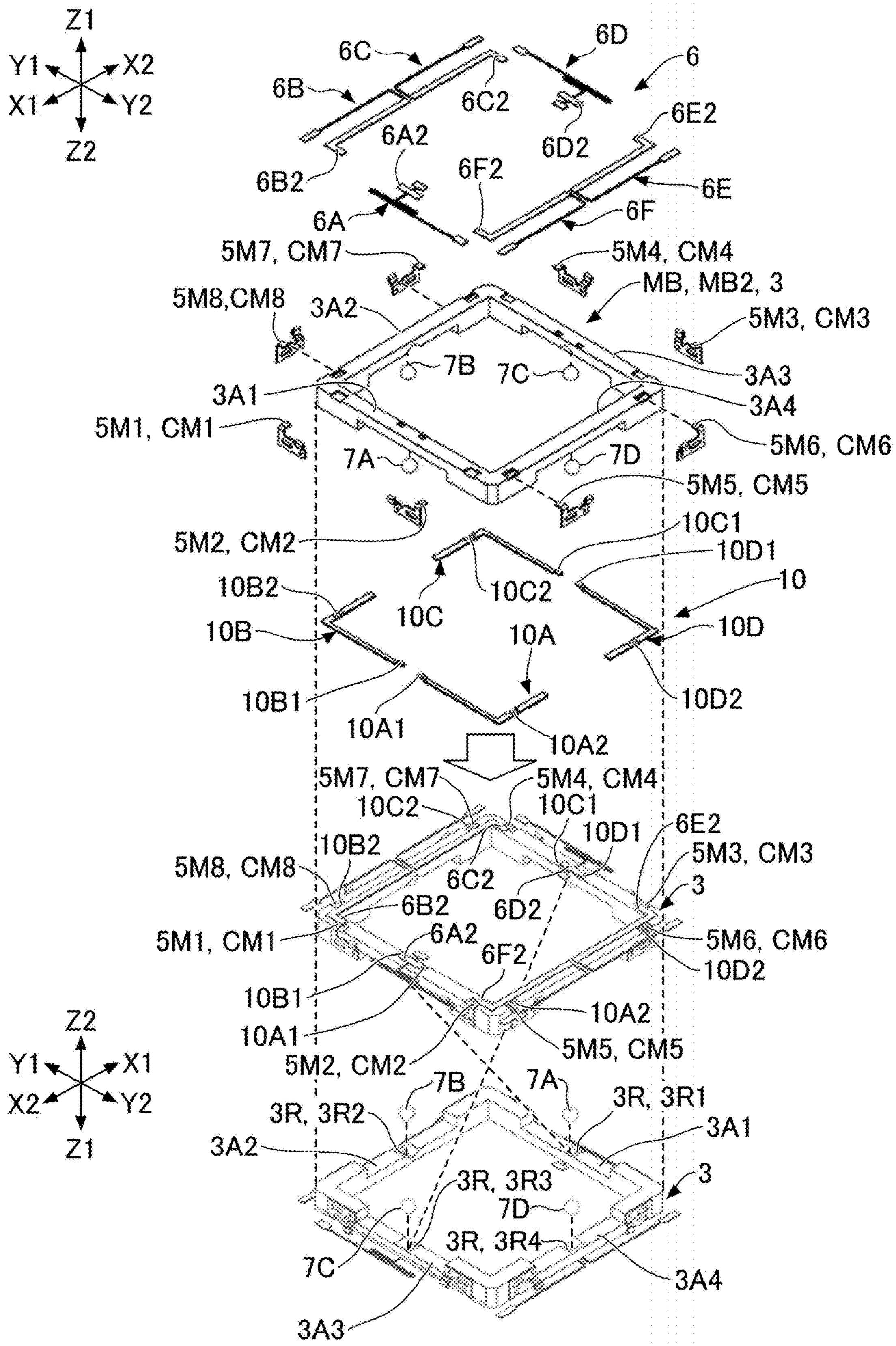
FIG. 5 is a perspective view of a connection member, a distal metal member, the flexible metal member, the spherical body, and a central conductive member.

Next, the positional relationship between the connection member 3 and each of the distal metal member 5M, the flexible metal member 6, the spherical body 7, and the central conductive member 10 will be described with reference to FIG. 5. FIG. 5 is a perspective view of the connection member 3, the distal metal member 5M, the flexible metal member 6, the spherical body 7, and the central conductive member 10. Specifically, the upper views (above the block arrow) in FIG. 5 are perspective views of the connection member 3, the distal metal member 5M, the flexible metal member 6, the spherical body 7, and the central conductive member 10 in a state in which they are separated from each other. The central view (below the block arrow) in FIG. 5 is an upper perspective view of the connection member 3 to which the distal metal member 5M, the flexible metal member 6, and the spherical body 7 are attached and in which the central conductive member 10 is embedded. The lower view in FIG. 5 is a lower perspective view of the connection member 3 to which the distal metal member 5M and the flexible metal member 6 are attached and in which the central conductive member 10 is embedded. In the lower view in FIG. 5, the spherical body 7 is removed from the connection member 3 for ease of understanding of the description.

The central conductive member 10 is formed of a metal, such as stainless steel, iron, or the like. In the illustrated example, the central conductive member 10 includes a first central conductive member 10A, a second central conductive member 10B, a third central conductive member 10C, and a fourth central conductive member 10D. The first central conductive member 10A includes a first portion 10A1 exposed to the upper surface of the first side portion 3A1 of the connection member 3, and a second portion 10A2 exposed to the upper surface of the fourth side portion 3A4 of the connection member 3. The second central conductive member 10B includes a first portion 10B1 exposed to the upper surface of the first side portion 3A1 of the connection member 3, and a second portion 10B2 exposed to the upper surface of the second side portion 3A2 of the connection member 3. The third central conductive member 10C includes a first portion 10C1 exposed to the upper surface of the third side portion 3A3 of the connection member 3, and a second portion 10C2 exposed to the upper surface of the second side portion 3A2 of the connection member 3. The fourth central conductive member 10D includes a first portion 10D1 exposed to the upper surface of the third side portion 3A3 of the connection member 3, and a second portion 10D2 exposed to the upper surface of the fourth side portion 3A4 of the connection member 3.

The first distal metal member 5M1 and the second distal metal member 5M2 are bonded to the outer surface (front surface) of the first side portion 3A1 of the connection member 3 by means of an adhesive, caulking, or the like. The third distal metal member 5M3 and the fourth distal metal member 5M4 are bonded to the outer surface (rear surface) of the third side portion 3A3 of the connection member 3 by means of an adhesive, caulking, or the like. The fifth distal metal member 5M5 and the sixth distal metal member 5M6 are bonded to the outer surface (right side surface) of the fourth side portion 3A4 of the connection member 3 by means of an adhesive, caulking, or the like. The seventh distal metal member 5M7 and the eighth distal metal member 5M8 are bonded to the outer surface (left side surface) of the second side portion 3A2 of the connection member 3 by means of an adhesive, caulking, or the like.

The first distal metal member 5M1 includes a first fixed portion CM1 that is overlapped with and bonded to the second portion 6B2 of the second flexible metal member 6B at the upper surface of the first side portion 3A1. The first fixed portion CM1 is formed by bending the upper portion of the first distal metal member 5M1 in an L shape. The first fixed portion CM1 is disposed at the lower surface of the second portion 6B2. The same applies to the second fixed portion CM2 of the second distal metal member 5M2 that is overlapped with and bonded to the second portion 6F2 of the sixth flexible metal member 6F at the upper surface of the first side portion 3A1, the third fixed portion CM3 of the third distal metal member 5M3 that is overlapped with and bonded to the second portion 6E2 of the fifth flexible metal member 6E at the upper surface of the third side portion 3A3, and the fourth fixed portion CM4 of the fourth distal metal member 5M4 that is overlapped with and bonded to the second portion 6C2 of the third flexible metal member 6C at the upper surface of the third side portion 3A3.

The fifth distal metal member 5M5 includes a fifth fixed portion CM5 that is overlapped with and bonded to the second portion 10A2 of the first central conductive member 10A at the upper surface of the fourth side portion 3A4. The fifth fixed portion CM5 is formed by bending the upper portion of the fifth distal metal member 5M5 in an L shape. The same applies to a sixth fixed portion CM6 of the sixth distal metal member 5M6 that is overlapped with and bonded to the second portion 10D2 of the fourth central conductive member 10D at the upper surface of the fourth side portion 3A4, a seventh fixed portion CM7 of the seventh distal metal member 5M7 that is overlapped with and bonded to the second portion 10C2 of the third central conductive member 10C at the upper surface of the second side portion 3A2, and an eighth fixed portion CM8 of the eighth distal metal member 5M8 that is overlapped with and bonded to the second portion 10B2 of the second central conductive member 10B at the upper surface of the second side portion 3A2.

The second portion 6A2 of the first flexible metal member 6A is overlapped with and bonded to the first portion 10A1 of the first central conductive member 10A and the first portion 10B1 of the second central conductive member 10B at the upper surface of the first side portion 3A1 of the connection member 3. Similarly, the second portion 6D2 of the fourth flexible metal member 6D is overlapped with and bonded to the first portion 10C1 of the third central conductive member 10C and the first portion 10D1 of the fourth central conductive member 10D at the upper surface of the third side portion 3A3 of the connection member 3.

Each of the four spherical bodies 7 is housed in and fixed to a recess 3R formed at the lower surface of the frame 3A of the connection member 3. In the illustrated example, the upper portion of the first spherical body 7A is housed in and adhesively fixed to a first recess 3R1 formed at the lower surface of the first side portion 3A1. The upper portion of the second spherical body 7B is housed in and adhesively fixed to a second recess 3R2 formed at the lower surface of the second side portion 3A2. The upper portion of the third spherical body 7C is housed in and adhesively fixed to a third recess 3R3 formed at the lower surface of the third side portion 3A3. The upper portion of the fourth spherical body 7D is housed in and adhesively fixed to a fourth recess 3R4 formed at the lower surface of the fourth side portion 3A4.

Figure 6:
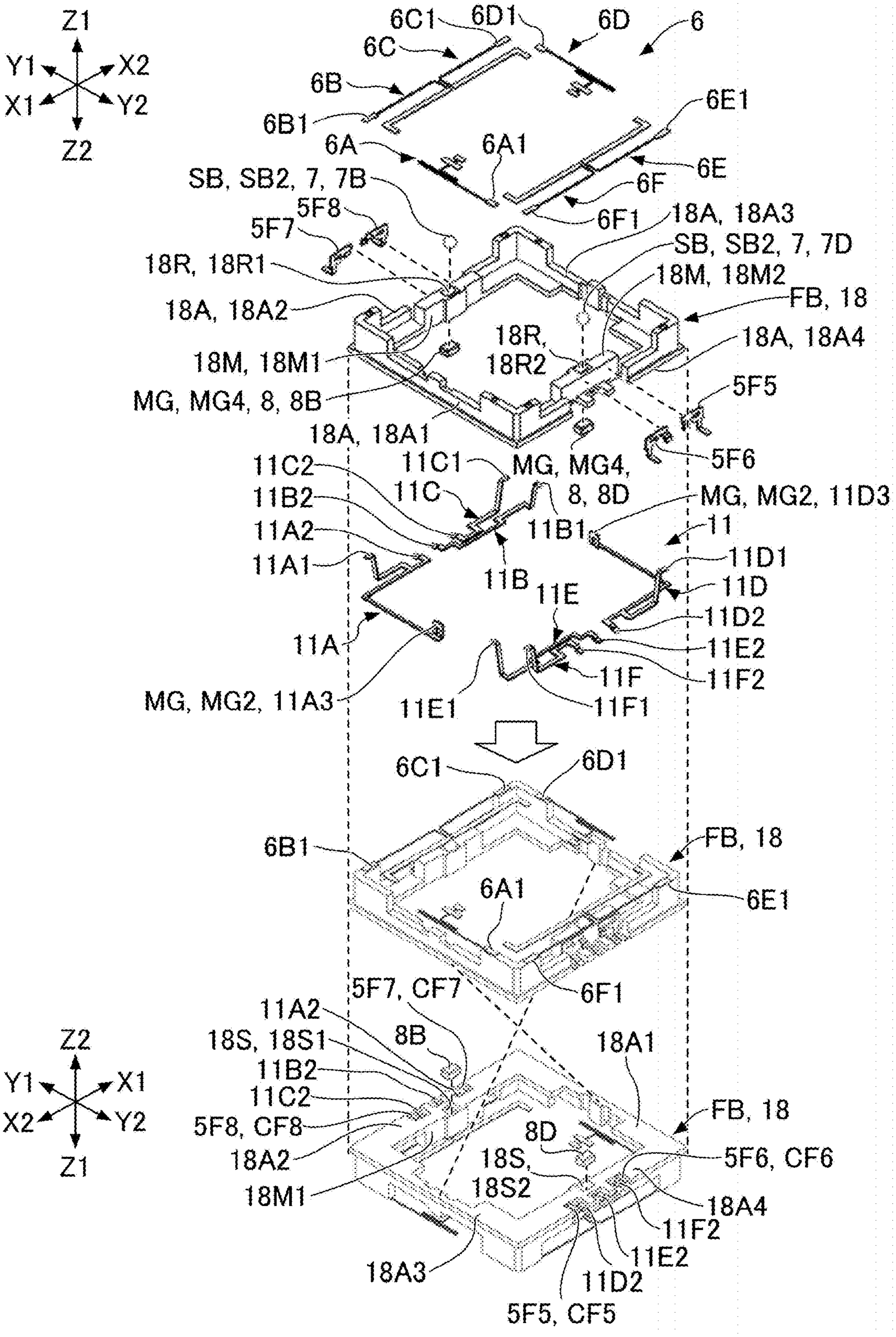
FIG. 6 is a perspective view of the proximal metal member, the flexible metal member, the spherical body, the magnet, an outer conductive member, and a base member.

Next, the positional relationship between the base member 18 and each of the proximal metal member 5F, the flexible metal member 6, the spherical body 7, the magnet 8, and the outer conductive member 11 will be described with reference to FIG. 6. FIG. 6 is a perspective view of the proximal metal member 5F, the flexible metal member 6, the spherical body 7, the magnet 8, the outer conductive member 11, and the base member 18. Specifically, the upper view (above the block arrow) in FIG. 6 is a perspective view of the proximal metal member 5F, the flexible metal member 6, the spherical body 7, the magnet 8, the outer conductive member 11, and the base member 18 in a state in which they are separated from each other. The central view (below the block arrow) in FIG. 6 is an upper perspective view of the base member 18 to which the proximal metal member 5F, the flexible metal member 6, the spherical body 7, and the magnet 8 are attached and in which the outer conductive member 11 is embedded. The lower view in FIG. 6 is a lower perspective view of the base member 18 to which the proximal metal member 5F, the flexible metal member 6, and the spherical body 7 are attached and in which the outer conductive member 11 is embedded. In the lower view of FIG. 6, the magnet 8 is removed from the base member 18 for ease of understanding of the description.

The outer conductive member 11 is formed of a magnetic metal, such as ferritic stainless steel, iron, or the like. In the illustrated example, the outer conductive member 11 includes a first outer conductive member 11A, a second outer conductive member 11B, a third outer conductive member 11C, a fourth outer conductive member 11D, a fifth outer conductive member 11E, and a sixth outer conductive member 11F. The first outer conductive member 11A includes a first portion 11A1 exposed to the upper surface of the second side portion 18A2 of the base member 18, a second portion 11A2 exposed to the lower surface of the second side portion 18A2 of the base member 18, and a third portion 11A3 forming the second magnetic member MG2, which is an example of the magnetic member MG. The second outer conductive member 11B includes a first portion 11B1 exposed to the upper surface of the third side portion 18A3 of the base member 18, and a second portion 11B2 exposed to the lower surface of the second side portion 18A2 of the base member 18. The third outer conductive member 11C includes a first portion 11C1 exposed to the upper surface of the second side portion 18A2 of the base member 18, and a second portion 11C2 exposed to the lower surface of the second side portion 18A2 of the base member 18. The fourth outer conductive member 11D includes a first portion 11D1 exposed to the upper surface of the fourth side portion 18A4 of the base member 18, a second portion 11D2 exposed to the lower surface of the fourth side portion 18A4 of the base member 18, and a third portion 11D3 forming the second magnetic member MG2, which is an example of the magnetic member MG. The fifth outer conductive member 11E includes a first portion 11E1 exposed to the upper surface of the first side portion 18A1 of the base member 18, and a second portion 11E2 exposed to the lower surface of the fourth side portion 18A4 of the base member 18. The sixth outer conductive member 11F includes a first portion 11F1 exposed to the upper surface of the fourth side portion 18A4 of the base member 18, and a second portion 11F2 exposed to the lower surface of the fourth side portion 18A4 of the base member 18.

The fifth proximal metal member 5F5 and the sixth proximal metal member 5F6 are bonded to the outer surface (right side surface) of the second support-mounting portion 18M2 of the base member 18 by means of an adhesive, caulking, or the like. Similarly, the seventh proximal metal member 5F7 and the eighth proximal metal member 5F8 are bonded to the outer surface (left side surface) of the first support-mounting portion 18M1 of the base member 18 by means of an adhesive, caulking, or the like.

The fifth proximal metal member 5F5 includes a fifth fixed portion CF5 extending outward (rightward) at the lower surface of the second support-mounting portion 18M2. The fifth fixed portion CF5 is formed by bending the lower portion of the fifth proximal metal member 5F5 in an L shape. The same applies to a sixth fixed portion CF6 of the sixth proximal metal member 5F6 extending outward (rightward) at the lower surface of the second support-mounting portion 18M2, a seventh fixed portion CF7 of the seventh proximal metal member 5F7 extending outward (leftward) at the lower surface of the first support-mounting portion 18M1, and an eighth fixed portion CF8 of the eighth proximal metal member 5F8 extending outward (leftward) at the lower surface of the first support-mounting portion 18M1.

The first portion 6A1 of the first flexible metal member 6A is overlapped with and bonded to the first portion 11E1 of the fifth outer conductive member 11E at the upper surface of the first side portion 18A1 of the base member 18. The first portion 6B1 of the second flexible metal member 6B is overlapped with and bonded to the first portion 11A1 of the first outer conductive member 11A at the upper surface of the second side portion 18A2 of the base member 18. The first portion 6C1 of the third flexible metal member 6C is overlapped with and bonded to the first portion 11C1 of the third outer conductive member 11C at the upper surface of the second side portion 18A2 of the base member 18. The first portion 6D1 of the fourth flexible metal member 6D is overlapped with and bonded to the first portion 11B1 of the second outer conductive member 11B at the upper surface of the third side portion 18A3 of the base member 18. The first portion 6E1 of the fifth flexible metal member 6E is overlapped with and bonded to the first portion 11D1 of the fourth outer conductive member 11D at the upper surface of the fourth side portion 18A4 of the base member 18. The first portion 6F1 of the sixth flexible metal member 6F is overlapped with and bonded to the first portion 11F1 of the sixth outer conductive member 11F at the upper surface of the fourth side portion 18A4 of the base member 18.

Of the four spherical bodies 7, the second spherical body 7B and the fourth spherical body 7D forming the second support SB2 are each housed in a recess 18R formed at the upper surface of the support-mounting portion 18M of the base member 18. In the illustrated example, the lower portion of the second spherical body 7B is slidably housed in a first recess 18R1 formed at the upper surface of the first support-mounting portion 18M1, and the lower portion of the fourth spherical body 7D is slidably housed in a second recess 18R2 formed at the upper surface of the second support-mounting portion 18M2.

Of the four magnets 8, the second magnet 8B and the fourth magnet 8D forming the fourth magnetic member MG4 are each housed in and fixed to a magnet-housing portion 18S formed at the lower surface of the support-mounting portion 18M of the base member 18. In the illustrated example, the second magnet 8B is housed in and adhesively fixed to a first magnet-housing portion 18S1 formed at the lower surface of the first support-mounting portion 18M1, and the fourth magnet 8D is housed in and adhesively fixed to a second magnet-housing portion 18S2 formed at the lower surface of the second support-mounting portion 18M2.

As illustrated in FIG. 4, the module holder 2 is configured to function as a wire support configured to support one end of each of the first wire SA1 to the fourth wire SA4. As illustrated in FIG. 6, the base member 18 is configured to function as a wire support configured to support one end of each of the fifth wire SA5 to the eighth wire SA8. As illustrated in FIG. 5, the connection member 3 is configured to function as a wire support configured to support the other end of each of the first wire SA1 to the eighth wire SA8. With this configuration, the optical module OM is supported by the first wire SA1 to the eighth wire SA8 in a manner rockable about each of the first axial line AX1 and the second axial line AX2.

Figure 7:
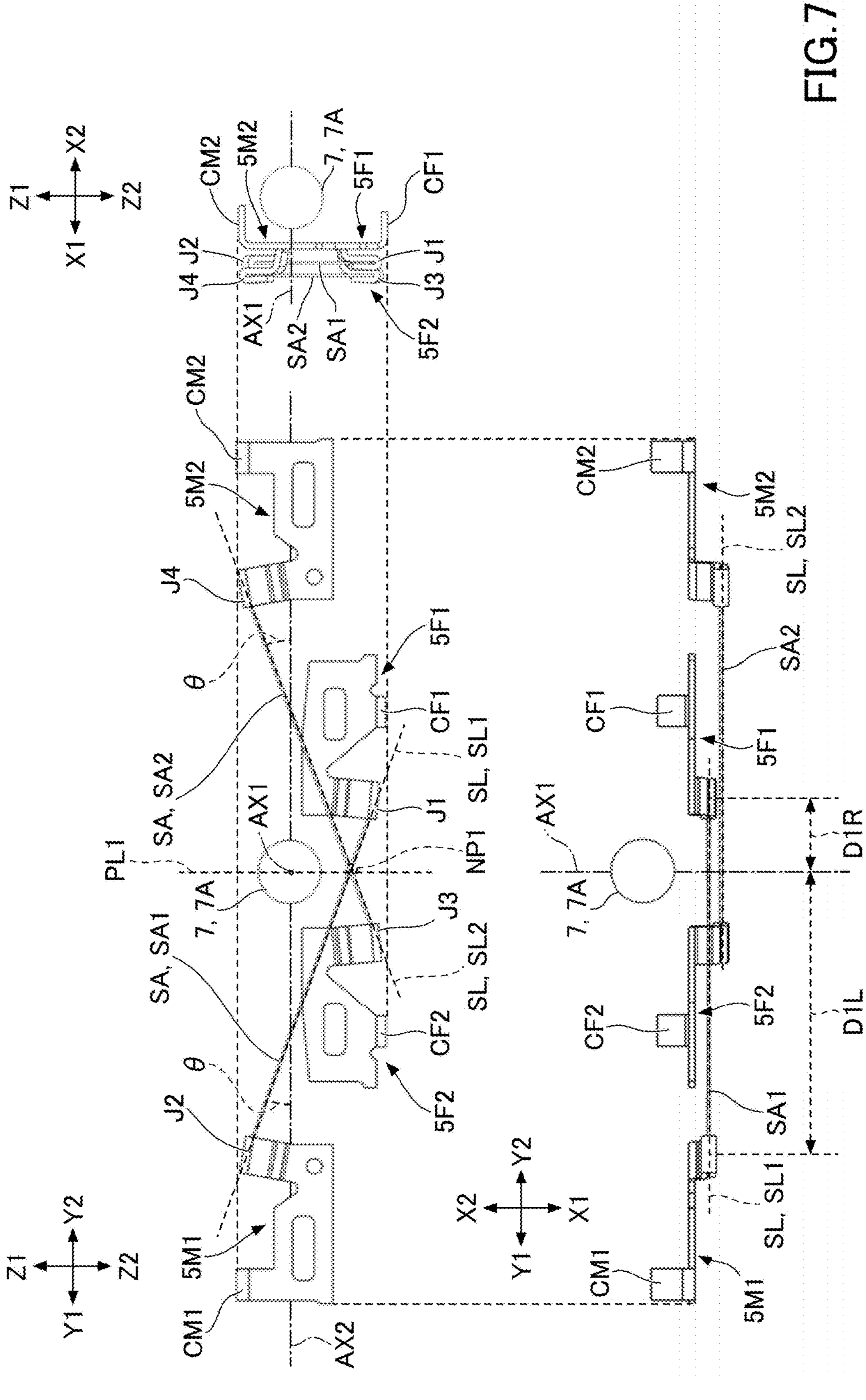
FIG. 7 is a three-side view (front view, top view, and right side view) of the metal member and the spherical body in a state in which shape memory alloy wires are attached.

Next, the metal member 5 to which the shape memory alloy wires SA are attached will be described with reference to FIGS. 7 and 8. FIG. 7 is a three-side view (front view, top view, and right side view) of the first proximal metal member 5F1, the second proximal metal member 5F2, the first distal metal member 5M1, the second distal metal member 5M2, the first wire SA1, the second wire SA2, and the first spherical body 7A. The positional relationship between the members illustrated in FIG. 7 corresponds to a positional relationship in a state in which the module driving device MD is assembled and a current is supplied to the first wire SA1 and the second wire SA2. In FIG. 7, illustration of the other members is omitted for ease of understanding. The following description to be made with reference to FIG. 7 relates to a combination of the first wire SA1 and the second wire SA2, but the same is applicable to a combination of the third wire SA3 and the fourth wire SA4.

Specifically, one end of the first wire SA1 is fixed to the first proximal metal member 5F1 at a holding portion J1 of the first proximal metal member 5F1, and the other end of the first wire SA1 is fixed to the first distal metal member 5M1 at a holding portion J2 of the first distal metal member 5M1. Similarly, one end of the second wire SA2 is fixed to the second proximal metal member 5F2 at a holding portion J3 of the second proximal metal member 5F2, and the other end of the second wire SA2 is fixed to the second distal metal member 5M2 at a holding portion J4 of the first distal metal member 5M1.

Figure 8:
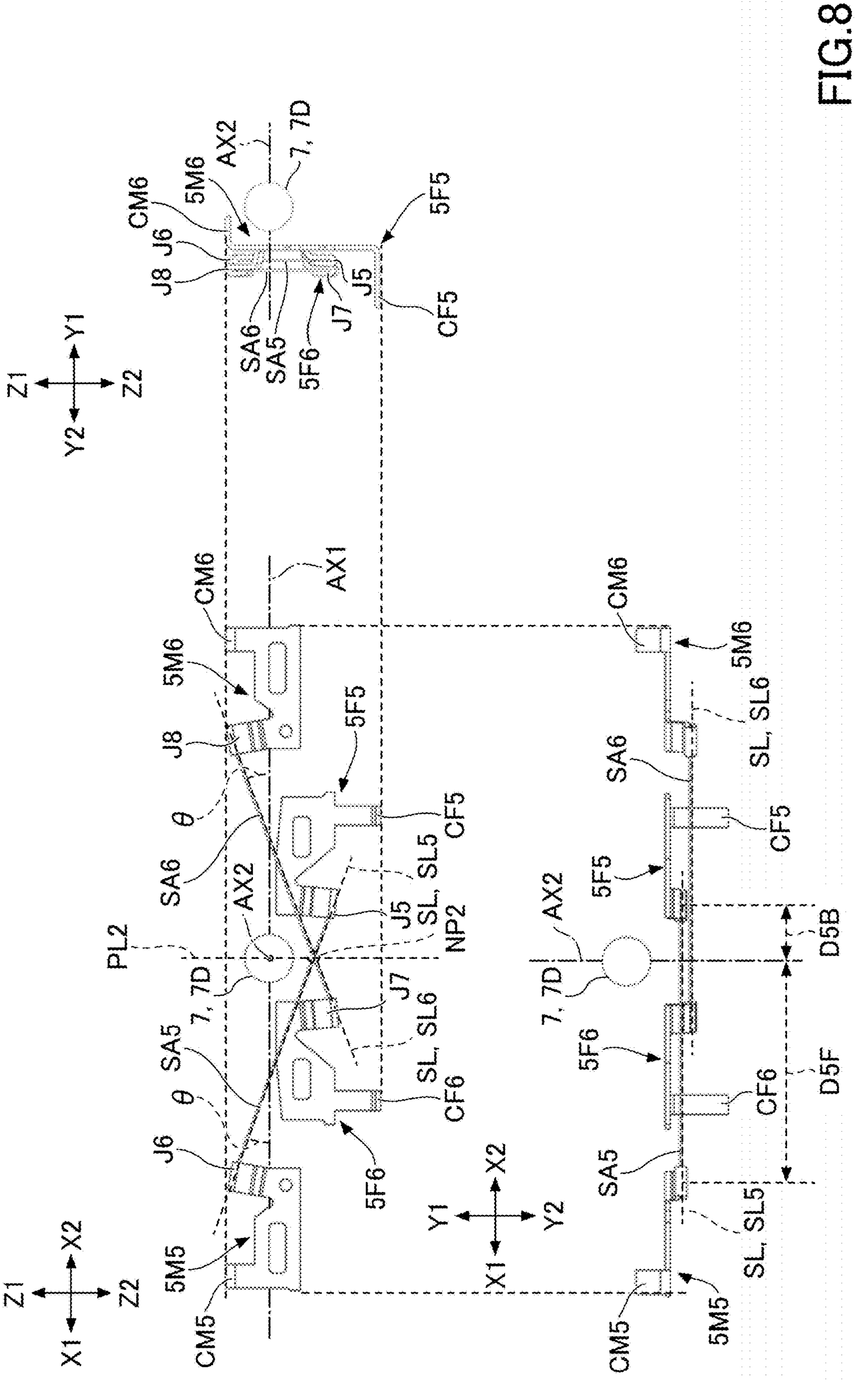
FIG. 8 is a three-side view (right side view, top view, and rear view) of the metal member and the spherical body in the state in which the shape memory alloy wires are attached.

FIG. 8 is a three-side view (right side view, top view, and rear view) of the fifth proximal metal member 5F5, the sixth proximal metal member 5F6, the fifth distal metal member 5M5, the sixth distal metal member 5M6, the fifth wire SA5, the sixth wire SA6, and the fourth spherical body 7D. The positional relationship between the members illustrated in FIG. 8 corresponds to a positional relationship in a state in which the module driving device MD is assembled and a current is supplied to the fifth wire SA5 and the sixth wire SA6. In FIG. 8, illustration of the other members is omitted for ease of understanding. The following description to be made with reference to FIG. 8 relates to a combination of the fifth wire SA5 and the sixth wire SA6, but the same is applicable to a combination of the seventh wire SA7 and the eighth wire SA8.

Specifically, one end of the fifth wire SA5 is fixed to the fifth proximal metal member 5F5 at a holding portion J5 of the fifth proximal metal member 5F5, and the other end of the fifth wire SA5 is fixed to the fifth distal metal member 5M5 at a holding portion J6 of the fifth distal metal member 5M5. Similarly, one end of the sixth wire SA6 is fixed to the sixth proximal metal member 5F6 at a holding portion J7 of the sixth proximal metal member 5F6, and the other end of the sixth wire SA6 is fixed to the sixth distal metal member 5M6 at a holding portion J8 of the sixth distal metal member 5M6.

The holding portion J1 is formed by bending a portion of the first proximal metal member 5F1. Specifically, the portion of the first proximal metal member 5F1 is caulked in a state of holding an end (one end) of the first wire SA1, thereby forming the holding portion J1. A coating of the end (one end) of the first wire SA1 is removed before the end (one end) of the first wire SA1 is held by the holding portion J1. The end (one end) of the first wire SA1 is fixed to the holding portion J1 through welding. Subsequently, the end (one end) of the first wire SA1 may be protected by a protective resin. The same applies to the holding portions J2 to J8.

The first wire SA1 and the second wire SA2 are disposed at skewed positions. That is, the first wire SA1 and the second wire SA2 are disposed so as not to contact each other (in a non-contact manner). Specifically, as illustrated in the front view in FIG. 7, the first wire SA1 and the second wire SA2 are disposed so as to cross each other as viewed from the X1 side (in a direction perpendicular to the plate surface of the first proximal metal member 5F1). Similarly, as illustrated in the right side view in FIG. 8, the fifth wire SA5 and the sixth wire SA6 are disposed so as to cross each other as viewed from the Y2 side (in a direction perpendicular to the plate surface of the fifth proximal metal member 5F5).

Figure 9:
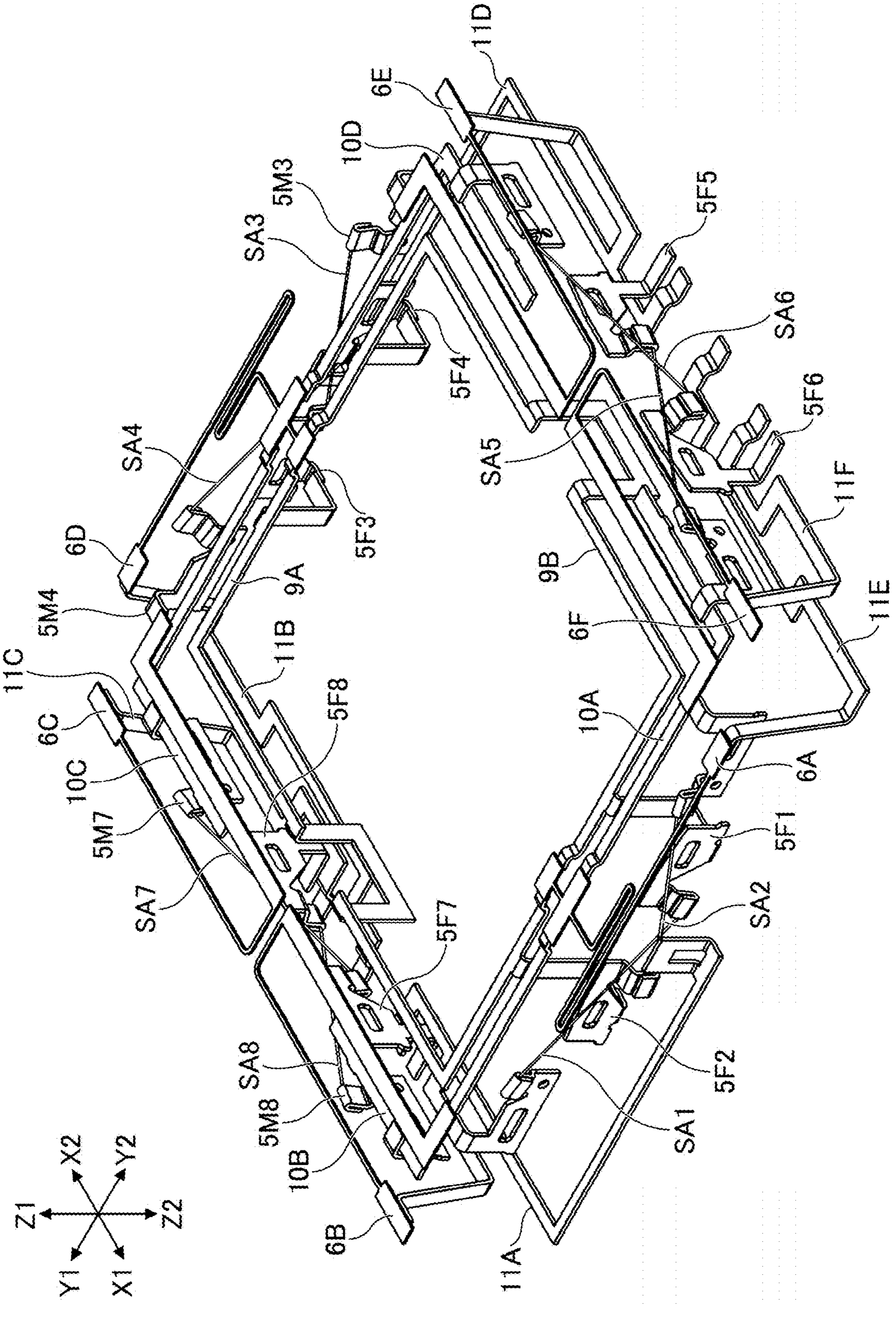
FIG. 9 is a perspective view of the metal member, the flexible metal member, the inner conductive member, the central conductive member, the outer conductive member, and the shape memory alloy wires.
Figure 10:
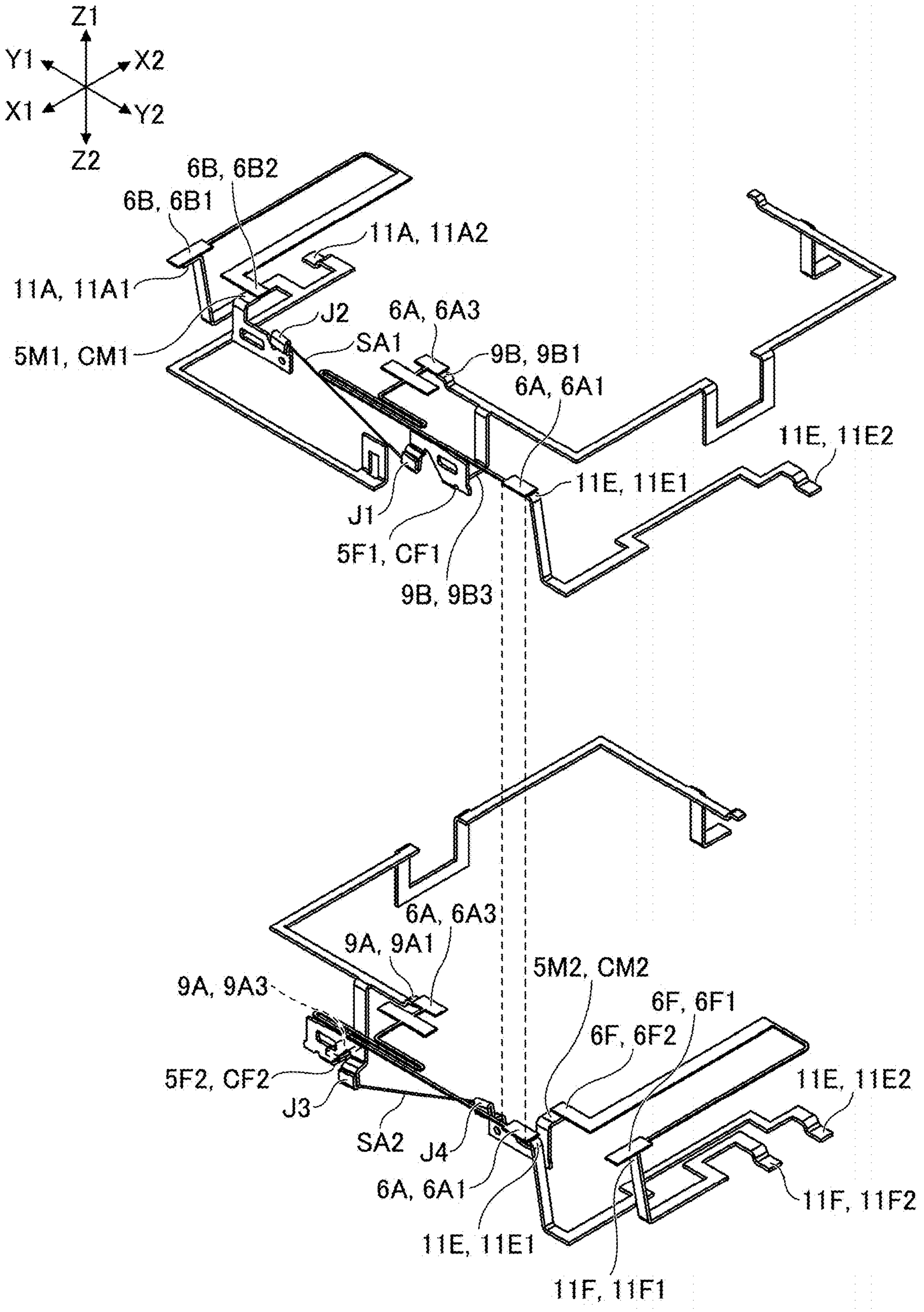
FIG. 10 is a perspective view of the metal member, the flexible metal member, the inner conductive member, the outer conductive member, and the shape memory alloy wires.
Figure 11:
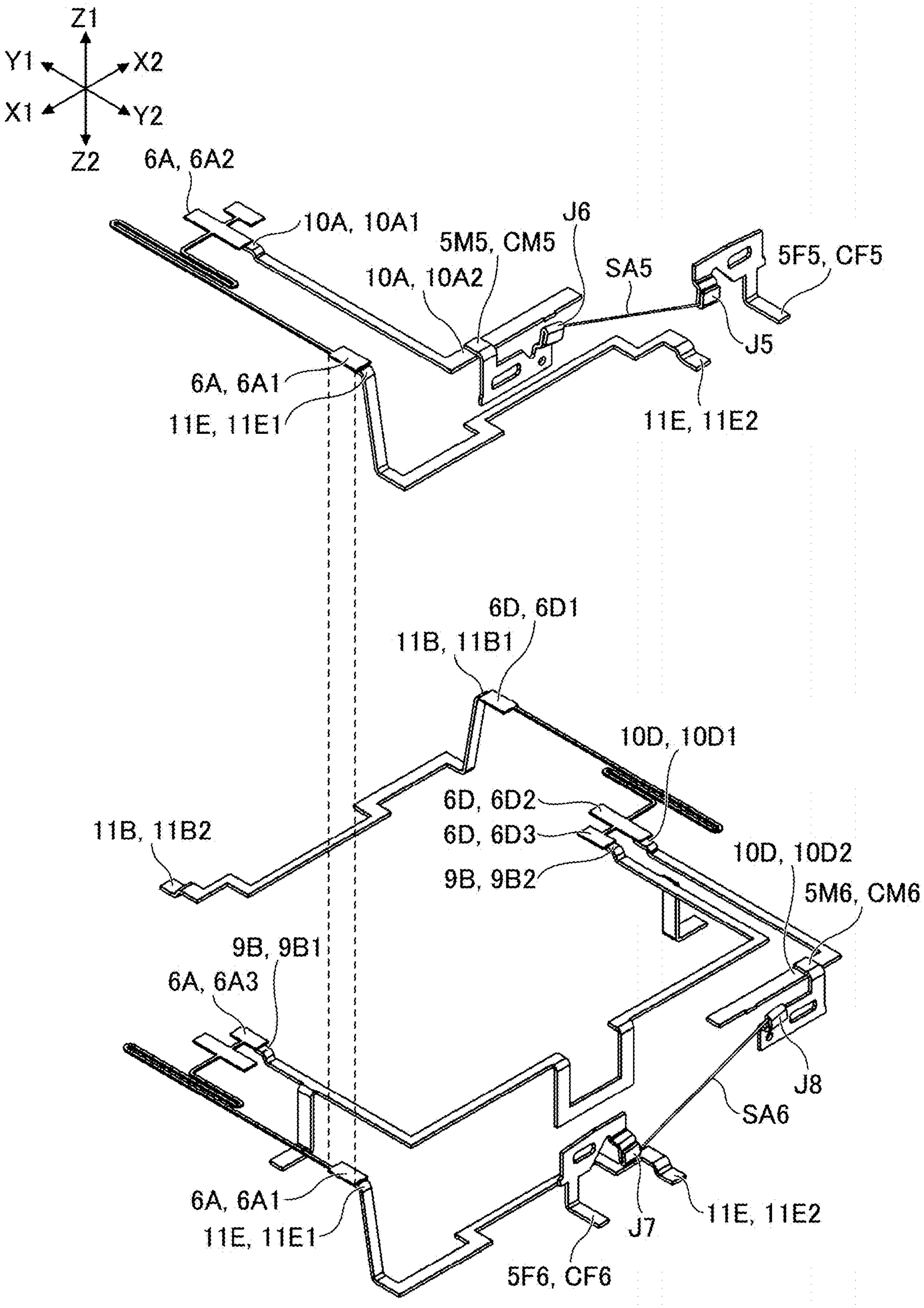
FIG. 11 is a perspective view of the metal member, the flexible metal member, the inner conductive member, the central conductive member, the outer conductive member, and the shape memory alloy wires.

Next, the path of the current flowing through the shape memory alloy wires SA will be described with reference to FIGS. 9 to 11. FIG. 9 is a perspective view of the metal member 5, the flexible metal member 6, the inner conductive member 9, the central conductive member 10, the outer conductive member 11, and the shape memory alloy wires SA. FIG. 10 is a perspective view of the metal member 5, the flexible metal member 6, the inner conductive member 9, the outer conductive member 11, and the shape memory alloy wires SA, and partially illustrates the members in FIG. 9. FIG. 11 is a perspective view of the metal member 5, the flexible metal member 6, the inner conductive member 9, the central conductive member 10, the outer conductive member 11, and the shape memory alloy wires SA, and partially illustrates the members in FIG. 9.

As illustrated in the upper view in FIG. 10, when the second portion 11A2 of the first outer conductive member 11A is connected to a high potential and the second portion 11E2 of the fifth outer conductive member 11E is connected to a low potential, a current flows from the second portion 11A2 of the first outer conductive member 11A to the second portion 11E2 of the fifth outer conductive member 11E through the first portion 11A1 of the first outer conductive member 11A, the first portion 6B1 and the second portion 6B2 of the second flexible metal member 6B, the first fixed portion CM1 and the holding portion J2 of the first distal metal member 5M1, the first wire SA1, the holding portion J1 and the first fixed portion CF1 of the first proximal metal member 5F1, the third portion 9B3 and the first portion 9B1 of the second inner conductive member 9B, the third portion 6A3 and the first portion 6A1 of the first flexible metal member 6A, and the first portion 11E1 of the fifth outer conductive member 11E.

Further, as illustrated in the lower view in FIG. 10, when the second portion 11F2 of the sixth outer conductive member 11F is connected to a high potential and the second portion 11E2 of the fifth outer conductive member 11E is connected to a low potential, a current flows from the second portion 11F2 of the sixth outer conductive member 11F to the second portion 11E2 of the fifth outer conductive member 11E through the first portion 11F1 of the sixth outer conductive member 11F, the first portion 6F1 and the second portion 6F2 of the sixth flexible metal member 6F, the second fixed portion CM2 and the holding portion J4 of the second distal metal member 5M2, the second wire SA2, the holding portion J3 and the second fixed portion CF2 of the second proximal metal member 5F2, the third portion 9A3 and the first portion 9A1 of the first inner conductive member 9A, the third portion 6A3 and the first portion 6A1 of the first flexible metal member 6A, and the first portion 11E1 of the fifth outer conductive member 11E.

Although the above description made with reference to FIG. 10 relates to the combination of the first wire SA1 and the second wire SA2, the same is applicable to the combination of the third wire SA3 and the fourth wire SA4.

Also, as illustrated in the upper view in FIG. 11, when the fifth fixed portion CF5 of the fifth proximal metal member 5F5 is connected to a high potential and the second portion 11E2 of the fifth outer conductive member 11E is connected to a low potential, a current flows from the fifth fixed portion CF5 of the fifth proximal metal member 5F5 to the second portion 11E2 of the fifth outer conductive member 11E through the holding portion J5 of the fifth proximal metal member 5F5, the fifth wire SA5, the holding portion J6 and the fifth fixed portion CM5 of the fifth distal metal member 5M5, the second portion 10A2 and the first portion 10A1 of the first central conductive member 10A, the second portion 6A2 and the first portion 6A1 of the first flexible metal member 6A, and the first portion 11E1 of the fifth outer conductive member 11E.

Also, as illustrated in the lower view in FIG. 11, when the sixth fixed portion CF6 of the sixth proximal metal member 5F6 is connected to a high potential and the second portion 11E2 of the fifth outer conductive member 11E is connected to a low potential, a current flows from the sixth fixed portion CF6 of the sixth proximal metal member 5F6 to the second portion 11E2 of the fifth outer conductive member 11E through the holding portion J7 of the sixth proximal metal member 5F6, the sixth wire SA6, the holding portion J8 and the sixth fixed portion CM6 of the sixth distal metal member 5M6, the second portion 10D2 and the first portion 10D1 of the fourth central conductive member 10D, the second portion 6D2 and the third portion 6D3 of the fourth flexible metal member 6D, the second portion 9B2 and the first portion 9B1 of the second inner conductive member 9B, the third portion 6A3 and the first portion 6A1 of the first flexible metal member 6A, and the first portion 11E1 of the fifth outer conductive member 11E.

The above description made with reference to FIG. 11 relates to the combination of the fifth wire SA5 and the sixth wire SA6, but the same is applicable to the combination of the seventh wire SA7 and the eighth wire SA8.

When causing a current to flow to the sixth wire SA6, the sixth fixed portion CF6 of the sixth proximal metal member 5F6 may be connected to a high potential and the second portion 11B2 of the second outer conductive member 11B may be connected to a low potential, as illustrated in the lower view in FIG. 11. In this case, the current flows from the sixth fixed portion CF6 of the sixth proximal metal member 5F6 to the second portion 11B2 of the second outer conductive member 11B through the holding portion J7 of the sixth proximal metal member 5F6, the sixth wire SA6, the holding portion J8 and the sixth fixed portion CM6 of the sixth distal metal member 5M6, the second portion 10D2 and the first portion 10D1 of the fourth central conductive member 10D, the second portion 6D2 and the first portion 6D1 of the fourth flexible metal member 6D, and the first portion 11B1 of the second outer conductive member 11B. Similarly, a current may be caused to flow to the first wire SA1 to the eighth wire SA8 through paths other than the paths described above.

The four examples illustrated in FIGS. 10 and 11 share the point that the second portion 11E2 of the fifth outer conductive member 11E is connected to a low potential, and are the same with regard to the path of the current flowing from the first flexible metal member 6A (the first portion 6A1) to the second portion 11E2 of the fifth outer conductive member 11E.

The controller CTR (see FIG. 1) located externally of the module driving device MD as described above can individually control the shrinkage of the first wire SA1 to the eighth wire SA8 by controlling a voltage to be applied to the fixed portion (the fifth fixed portion CF5 to the eighth fixed portion CF8) of the proximal metal member 5F and the second portion (the second portion 11A2 of the first outer conductive member 11A to the second portion 11F2 of the sixth outer conductive member 11F) of the outer conductive member 11. The controller CTR may be configured to detect resistance values of the first wire SA1 to the eighth wire SA8 and perform feedback control on the amount of shrinkage of the first wire SA1 to the eighth wire SA8. In this case, the controller CTR can derive the position and the posture of the module holder 2 in accordance with the resistance values of the first wire SA1 to the eighth wire SA8. The controller CTR may also be disposed in the module driving device MD. The controller CTR may also be a component that forms the module driving device MD.

The controller CTR can rock the module holder 2 about the first axial line AX1 and the second axial line AX2, for example, by utilizing a driving force generated by the action of shrinkage of the shape memory alloy wires SA serving as the driver DM.

Next, details of the driver DM will be described with reference to FIGS. 12 to 16. FIG. 12 is a table illustrating extension and shrinkage of the shape memory alloy wires SA at the time of achieving three degrees of freedom of movement of the module holder 2. Specifically, "shrinkage" in FIG. 12 indicates shrinking the shape memory alloy wires SA that are in a reference state, "extension" in FIG. 12 indicates extending the shape memory alloy wires SA that are in the reference state, and "-" in FIG. 12 indicates neither shrinking nor extending the shape memory alloy wires SA that are in the reference state. The reference state means a state of the shape memory alloy wires SA when the module driving device MD is in a neutral state. In the illustrated example, when the module driving device MD is in a neutral state, each of the first wire SA1 to the eighth wire SA8 is not loosened because a current is flowing through each of the first wire SA1 to the eighth wire SA8. The neutral state of the module driving device MD is, for example, a state in which the movable-side member MB (the module holder 2 and the connection member 3) is positioned in the middle of a range rotatable about each of the three axes orthogonal to each other (X axis, Y axis, and Z axis), i.e., a state in which the movable-side member MB (the module holder 2 and the connection member 3) is at a neutral position. Typically, in the neutral state of the module driving device MD, the module holder 2 is positioned at the center of the range rotatable about each of the three axes, and the connection member 3 is positioned at the center of the range rotatable about each of the two axes (Y axis and Z axis). The connection member 3 does not rotate about the X axis. Also, the module holder 2 and the connection member 3 do not translate along any of the X axis, the Y axis, and the Z axis.

Figure 13:
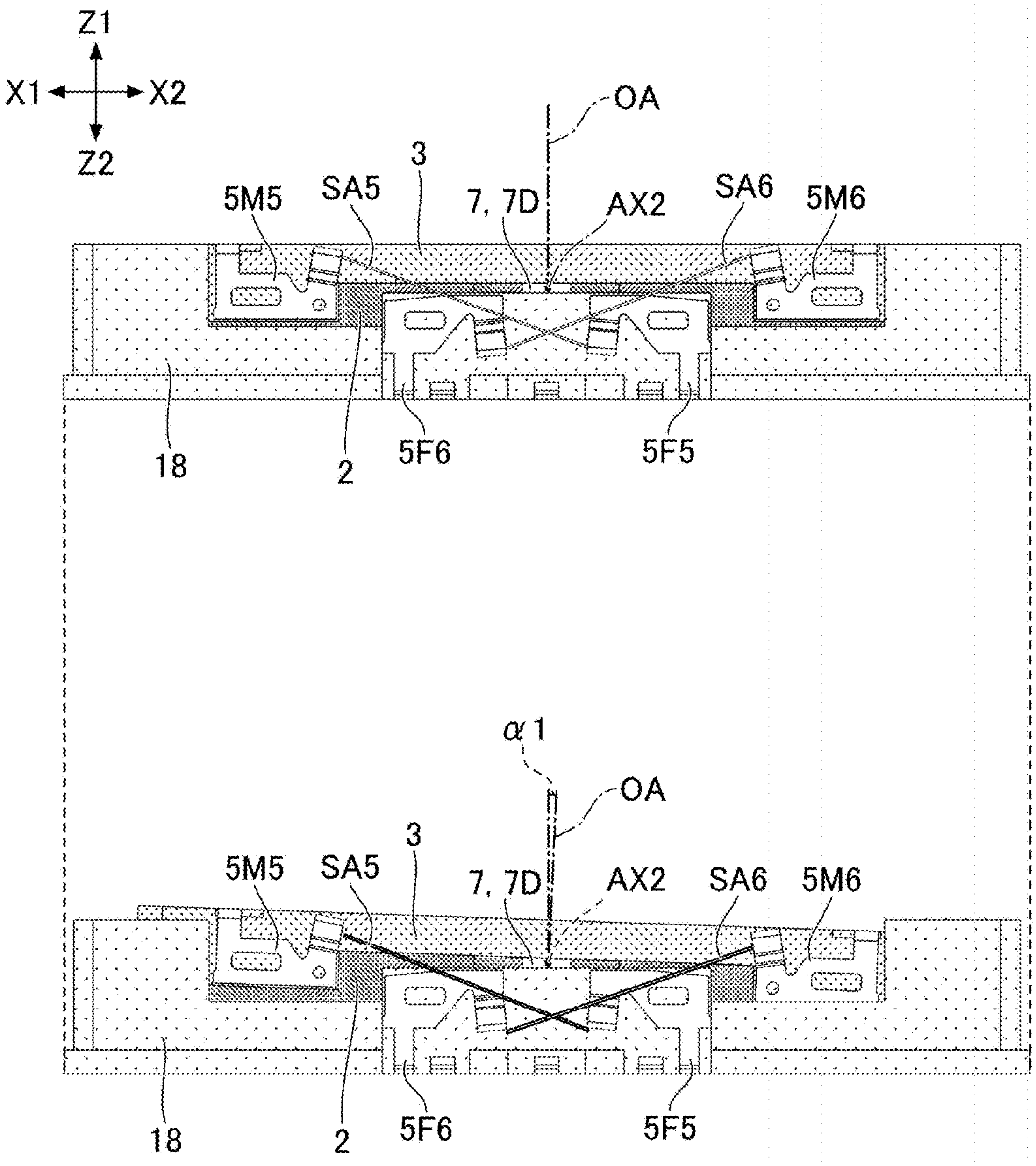
FIG. 13 is a right side view of the module holder, the connection member, the metal member, the base member, and the shape memory alloy wires.
Figure 14:
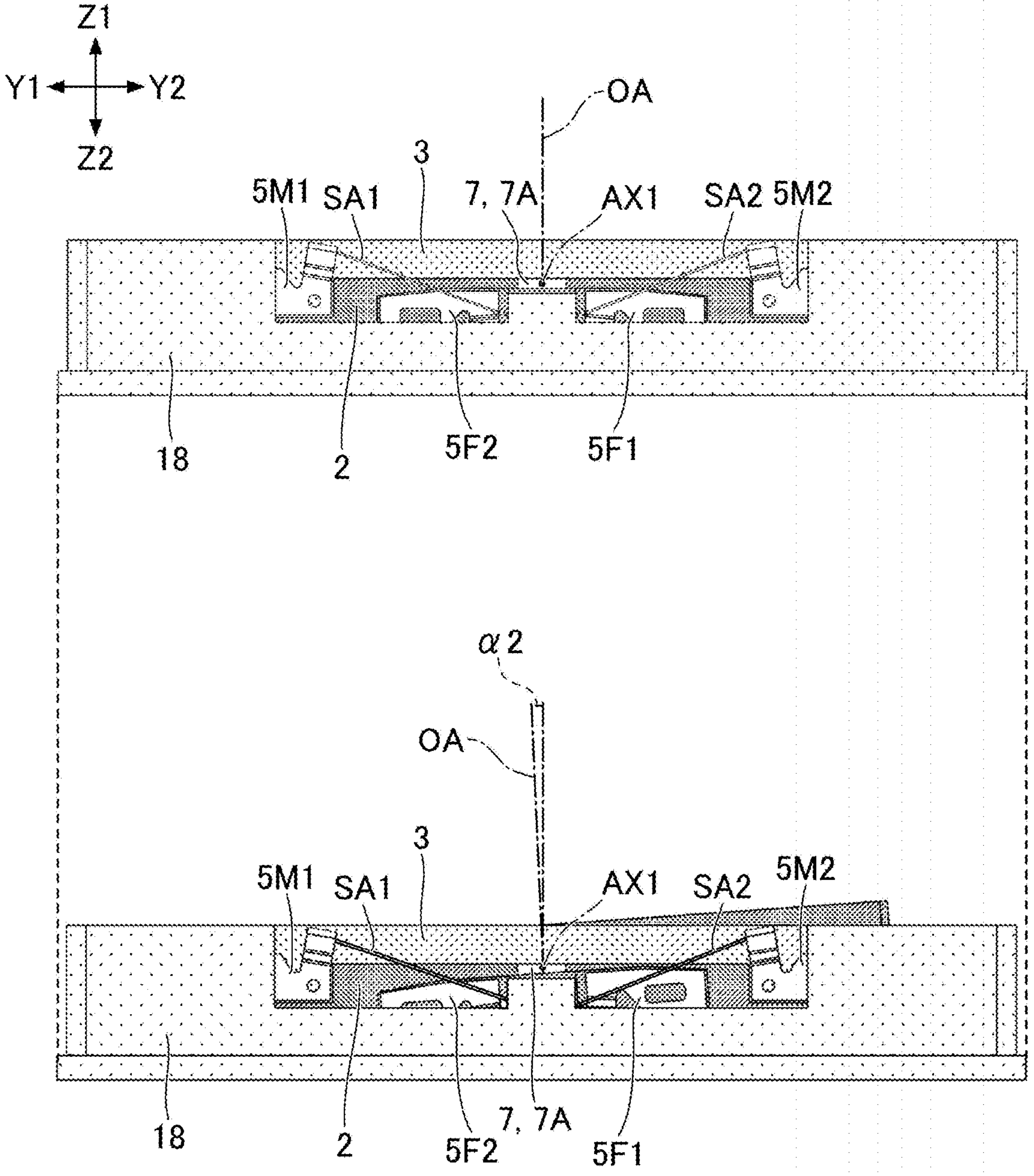
FIG. 14 is a front view of the module holder, the connection member, the metal member, the base member, and the shape memory alloy wires.
Figure 15:
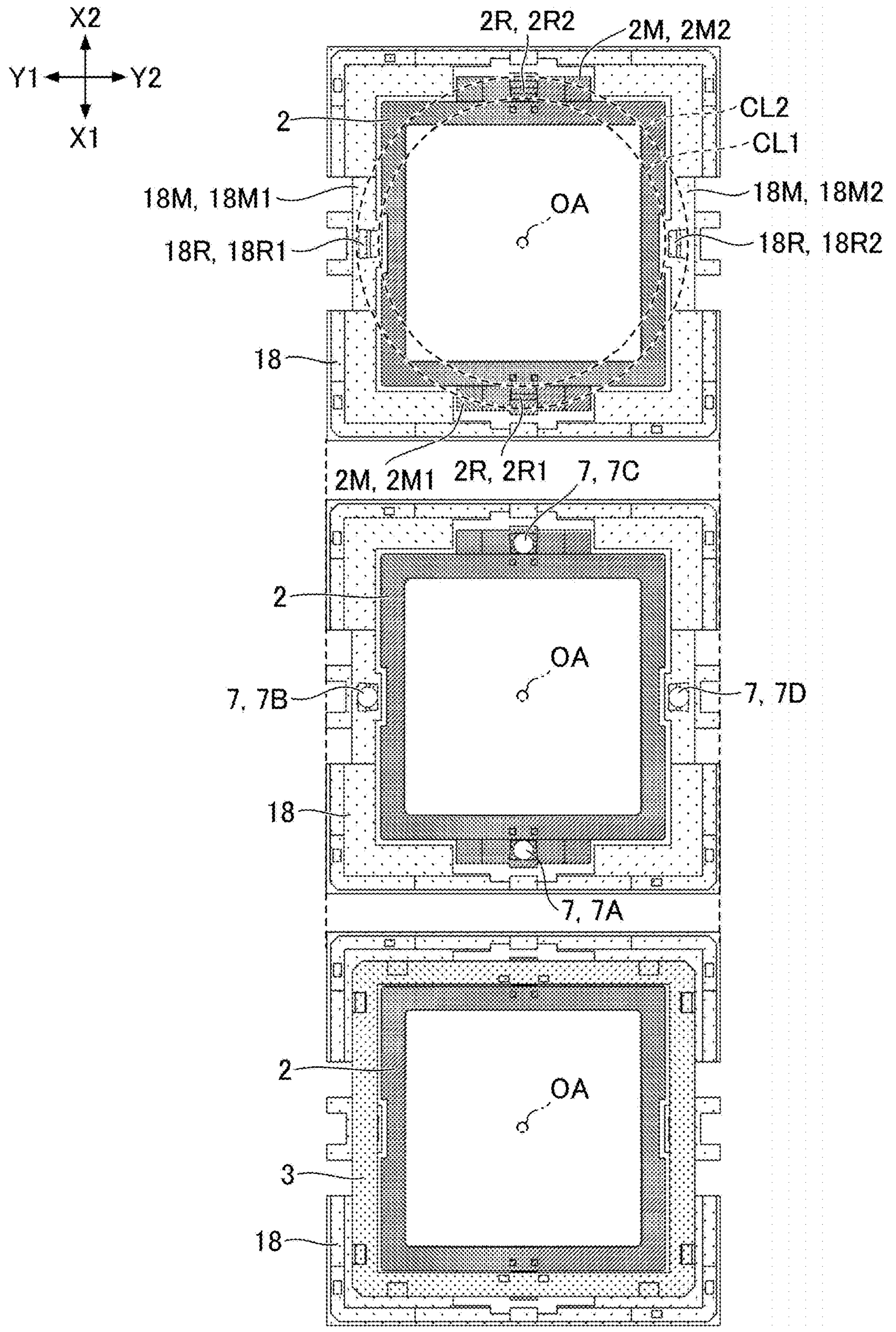
FIG. 15 is a top view of the module holder, the connection member, and the base member.
Figure 16:
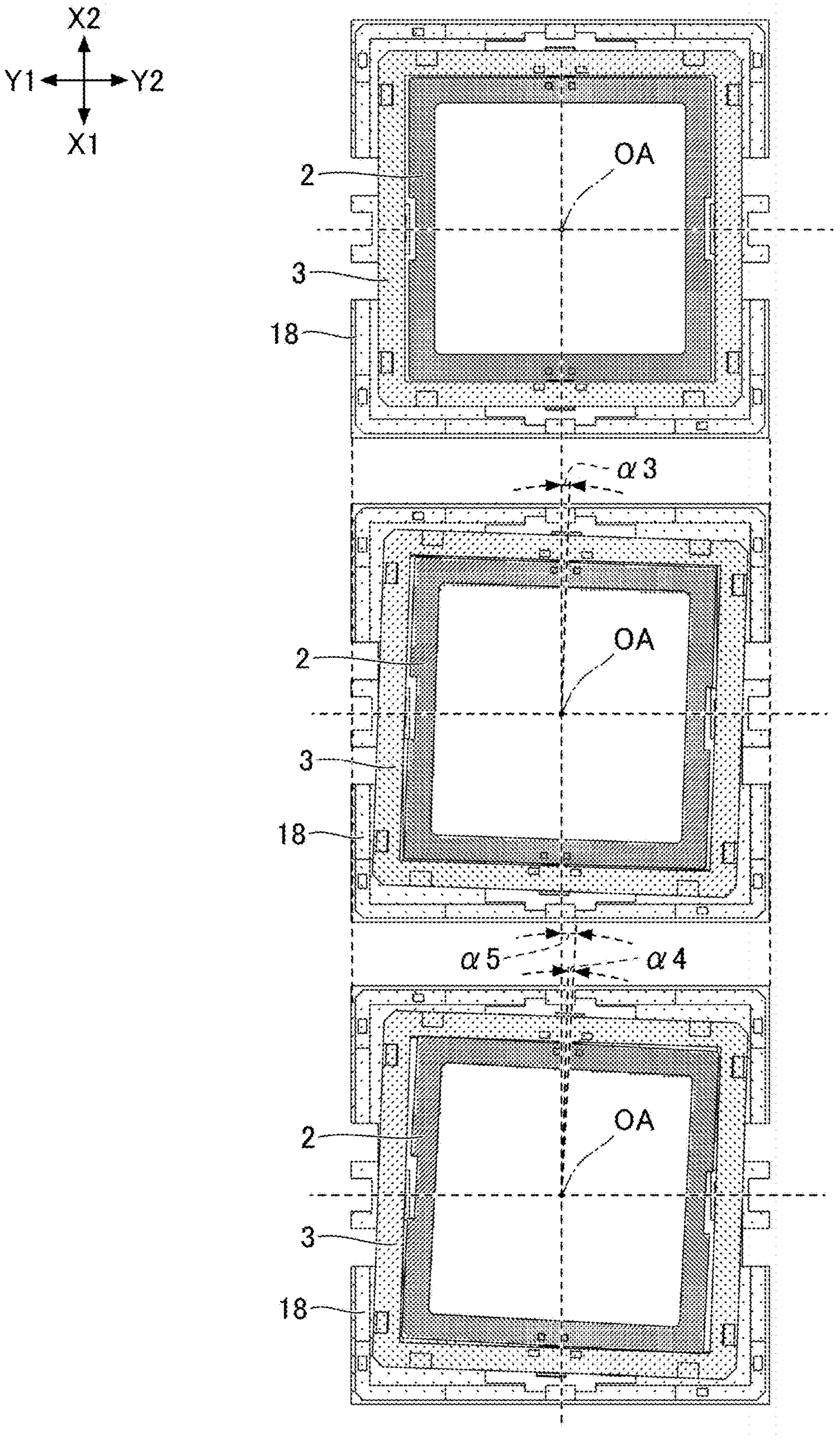
FIG. 16 is a top view of the module holder, the connection member, and the base member.

FIG. 13 is a right side view of three members, i.e., the module holder 2, the connection member 3, and the base member 18, when the module holder 2 and the connection member 3 rotate (rock) about the second axial line AX2 relative to the base member 18. FIG. 14 is a front view of the three members when the module holder 2 rotates (rocks) about the first axial line AX1 relative to the connection member 3. FIG. 15 is a top view of the module holder 2, the connection member 3, the spherical body 7, and the base member 18. FIG. 16 is a top view of the three members when the module holder 2 and the connection member 3 rotate (revolve) about the optical axis OA relative to the base member 18. In FIGS. 13 to 16, for ease of understanding, the module holder 2 is provided with a fine dot pattern, the connection member 3 is provided with a rough dot pattern, and the base member 18 is provided with a rougher dot pattern. FIGS. 13 and 14 illustrate a portion of the metal member 5 and the shape memory alloy wires SA for ease of understanding of the description.

FIG. 13 is a right side view of the three members when the module holder 2 and the connection member 3 rock clockwise about the second axial line AX2 by an angle α1 relative to the base member 18. Specifically, the upper view in FIG. 13 is a right side view of the three members before the module holder 2 and the connection member 3 rotate (rock), and the lower view in FIG. 13 is a right side view of the three members after the module holder 2 and the connection member 3 rotate (rock). When rocking the module holder 2 and the connection member 3 clockwise about the second axial line AX2 relative to the base member 18 in the right side view, the controller CTR extends the fifth wire SA5 and the eighth wire SA8 by substantially the same amount of extension, and shrinks the sixth wire SA6 and the seventh wire SA7 by substantially the same amount of shrinkage, as illustrated in the table of FIG. 12. In the illustrated example, extending the two shape memory alloy wires SA by substantially the same amount of extension means extending the two shape memory alloy wires SA until the lengths of the two shape memory alloy wires SA become substantially the same predetermined length. Similarly, shrinking the two shape memory alloy wires SA by substantially the same amount of shrinkage means shrinking the two shape memory alloy wires SA until the lengths of the two shape memory alloy wires SA become substantially the same predetermined length. The same applies in the following description. The controller CTR maintains the amount of extension or shrinkage of the first wire SA1 to the fourth wire SA4. Specifically, the controller CTR individually adjusts the magnitude of a current supplied to each of the first wire SA1 to the eighth wire SA8, thereby controlling the amount of extension or shrinkage of each of the first wire SA1 to the eighth wire SA8 in the above-described manner. By this control performed by the controller CTR, the driver DM can rock the module holder 2 and the connection member 3 clockwise about the second axial line AX2 relative to the base member 18, as illustrated in the lower view in FIG. 13.

When rotating the module holder 2 and the connection member 3 counterclockwise about the second axial line AX2 relative to the base member 18 in the right side view, the controller CTR shrinks the fifth wire SA5 and the eighth wire SA8 by substantially the same amount of shrinkage, and extends the sixth wire SA6 and the seventh wire SA7 by substantially the same amount of extension, as illustrated in the table of FIG. 12. The controller CTR maintains the amount of extension or shrinkage of the first wire SA1 to the fourth wire SA4. The controller CTR individually adjusts the magnitude of a current supplied to each of the first wire SA1 to the eighth wire SA8, thereby controlling the amount of extension or shrinkage of each of the first wire SA1 to the eighth wire SA8 in the above-described manner. By this control performed by the controller CTR, the driver DM can rock the module holder 2 and the connection member 3 counterclockwise about the second axial line AX2 relative to the base member 18.

FIG. 14 is a front view of the three members when the module holder 2 rocks counterclockwise by an angle α2 about the first axial line AX1 relative to the connection member 3 and the base member 18. Specifically, the upper view in FIG. 14 is a front view of the three members before the module holder 2 rotates (rocks), and the lower view of FIG. 14 is a front view of the three members after the module holder 2 rotates (rocks). When rocking the module holder 2 counterclockwise about the first axial line AX1 relative to the connection member 3 in the front view, the controller CTR extends the first wire SA1 and the fourth wire SA4 by substantially the same amount of extension, and shrinks the second wire SA2 and the third wire SA3 by substantially the same amount of shrinkage, as illustrated in the table of FIG. 12. The controller CTR maintains the amount of extension or shrinkage of the fifth wire SA5 to the eighth wire SA8. Specifically, the controller CTR individually adjusts the magnitude of a current supplied to each of the first wire SA1 to the eighth wire SA8, thereby controlling the amount of extension or shrinkage of each of the first wire SA1 to the eighth wire SA8 in the above-described manner. By this control performed by the controller CTR, the driver DM can rock the module holder 2 counterclockwise about the first axial line AX1 relative to the connection member 3, as illustrated in the lower view in FIG. 14.

When rocking the module holder 2 clockwise about the first axial line AX1 relative to the connection member 3 in the front view, the controller CTR shrinks the first wire SAL and the fourth wire SA4 by substantially the same amount of shrinkage, and extends the second wire SA2 and the third wire SA3 by substantially the same amount of extension, as illustrated in the table of FIG. 12. The controller CTR maintains the amount of extension or shrinkage of the fifth wire SA5 to the eighth wire SA8. Specifically, the controller CTR individually adjusts the magnitude of a current supplied to each of the first wire SA1 to the eighth wire SA8, thereby controlling the amount of extension or shrinkage of each of the first wire SA1 to the eighth wire SA8 in the above-described manner. By this control performed by the controller CTR, the driver DM can rock the module holder 2 clockwise about the first axial line AX1 relative to the connection member 3.

FIG. 15 is a top view of the module holder 2, the connection member 3, the spherical body 7, and the base member 18. Specifically, the upper view in FIG. 15 is a top view of the module holder 2 and the base member 18, the central view in FIG. 15 is a top view of the module holder 2, the spherical body 7, and the base member 18, and the lower view in FIG. 15 is a top view of the module holder 2, the connection member 3, and the base member 18.

As illustrated in the upper view in FIG. 15, a pair of recesses 2R are formed at the upper surface of the support-mounting portion 2M of the module holder 2 so as to face each other across the optical axis OA, and a pair of recesses 18R are formed at the upper surface of the support-mounting portion 18M of the base member 18 so as to face each other across the optical axis OA. Specifically, the recesses 2R include the first recess 2R1 formed at the upper surface of the first support-mounting portion 2M1 on the front side of the optical axis OA, and the second recess 2R2 formed at the upper surface of the second support-mounting portion 2M2 on the rear side of the optical axis OA. The recesses 18R include the first recess 18R1 formed at the upper surface of the first support-mounting portion 18M1 on the left side of the optical axis OA, and the second recess 18R2 formed at the upper surface of the second support-mounting portion 18M2 on the right side of the optical axis OA.

The first recess 2R1, the second recess 2R2, the first recess 18R1, and the second recess 18R2 are V-shaped grooves that are disposed in a region that is annular in a plan view, between two concentric circles centered on the optical axis OA, i.e., a first circle CL1 and a second circle CL2. The V-shaped grooves have a narrow bottom surface extending in a shape that is partially annular in a plan view.

The four spherical bodies 7 adhesively fixed to the interior of the recess 3R of the connection member 3 (see the lower view in FIG. 5) are disposed in the first recess 2R1, the second recess 2R2, the first recess 18R1, and the second recess 18R2, as illustrated in the central view in FIG. 15. Specifically, the first spherical body 7A is disposed in the first recess 2R1 so as to be slidable in the first recess 2R1 along the circumferential direction of the first circle CL1, the second spherical body 7B is disposed in the first recess 18R1 so as to be slidable in the first recess 18R1 along the circumferential direction of the first circle CL1, the third spherical body 7C is disposed in the second recess 2R2 so as to be slidable in the second recess 2R2 along the circumferential direction of the first circle CL1, and the fourth spherical body 7D is disposed in the second recess 18R2 so as to be slidable in the second recess 18R2 along the circumferential direction of the first circle CL1.

With this configuration, the module holder 2 and the connection member 3 are connected such that the module holder 2 and the connection member 3 are rotatable about the optical axis OA relative to each other, and the connection member 3 and the base member 18 are connected such that the connection member 3 and the base member 18 are rotatable about the optical axis OA relative to each other.

FIG. 16 is a top view of the three members when the connection member 3 rotates clockwise about the optical axis OA by an angle α3 relative to the base member 18, and the module holder 2 rotates clockwise about the optical axis OA by an angle α4 relative to the connection member 3. That is, FIG. 16 is a top view of the three members when the module holder 2 rotates clockwise about the optical axis OA by an angle α5 relative to the base member 18. The angle α5 is the sum of the angle α3 and the angle α4. Specifically, the upper view in FIG. 16 is a top view of the three members before the module holder 2 and the connection member 3 rotate, the central view in FIG. 16 is a top view of the three members after the module holder 2 and the connection member 3 rotate by the angle α3, and the lower view in FIG. 16 is a top view of the three members after the module holder 2 further rotates by the angle α4.

When rotating the connection member 3 clockwise about the optical axis OA relative to the base member 18 in the top view (plan view), the controller CTR shrinks the sixth wire SA6 and the eighth wire SA8 by substantially the same amount of shrinkage, and extends the fifth wire SA5 and the seventh wire SA7 by substantially the same amount of extension, as illustrated in the table of FIG. 12. When rotating the module holder 2 clockwise about the optical axis OA relative to the connection member 3 in the top view, the controller CTR extends the second wire SA2 and the fourth wire SA4 by substantially the same amount of extension, and shrinks the first wire SA1 and the third wire SA3 by substantially the same amount of shrinkage, as illustrated in the table of FIG. 12. Specifically, the controller CTR individually adjusts the magnitude of a current supplied to each of the first wire SA1 to the eighth wire SA8, thereby controlling the amount of extension or shrinkage of each of the first wire SA1 to the eighth wire SA8 in the above-described manner. By this control performed by the controller CTR, the driver DM can rotate the connection member 3 clockwise about the optical axis OA relative to the base member 18 as illustrated in the central view in FIG. 16, and can rotate the module holder 2 clockwise about the optical axis OA relative to the connection member 3 as illustrated in the lower view in FIG. 16.

When rotating the connection member 3 counterclockwise about the optical axis OA relative to the base member 18 in the top view, the controller CTR extends the sixth wire SA6 and the eighth wire SA8 by substantially the same amount of extension, and shrinks the fifth wire SA5 and the seventh wire SA7 by substantially the same amount of shrinkage, as illustrated in the table in FIG. 12. When rotating the module holder 2 counterclockwise about the optical axis OA relative to the connection member 3 in the top view, the controller CTR shrinks the second wire SA2 and the fourth wire SA4 by substantially the same amount of shrinkage, and extends the first wire SA1 and the third wire SA3 by substantially the same amount of extension, as illustrated in the table in FIG. 12. Specifically, the controller CTR individually adjusts the magnitude of a current supplied to each of the first wire SA1 to the eighth wire SA8, thereby controlling the amount of extension or shrinkage of each of the first wire SA1 to the eighth wire SA8 in the above-described manner. By this control performed by the controller CTR, the driver DM can rotate the connection member 3 counterclockwise about the optical axis OA relative to the base member 18, and can rotate the module holder 2 counterclockwise about the optical axis OA relative to the connection member 3.

The table of FIG. 12 illustrates the extension or shrinkage state of the shape memory alloy wires SA when rotating the connection member 3 about the optical axis OA relative to the base member 18 in the top view and at the same time rotating the module holder 2 in the same direction about the optical axis OA relative to the connection member 3 in the top view.

However, the controller CTR may maintain the amount of extension or shrinkage of the first wire SA1 to the fourth wire SA4, thereby rotating only the connection member 3 about the optical axis OA relative to the base member 18 in the top view. Alternatively, the controller CTR may maintain the amount of extension or shrinkage of the fifth wire SA5 to the eighth wire SA8, thereby rotating only the module holder 2 about the optical axis OA relative to the connection member 3 in the top view.

Figure 17:
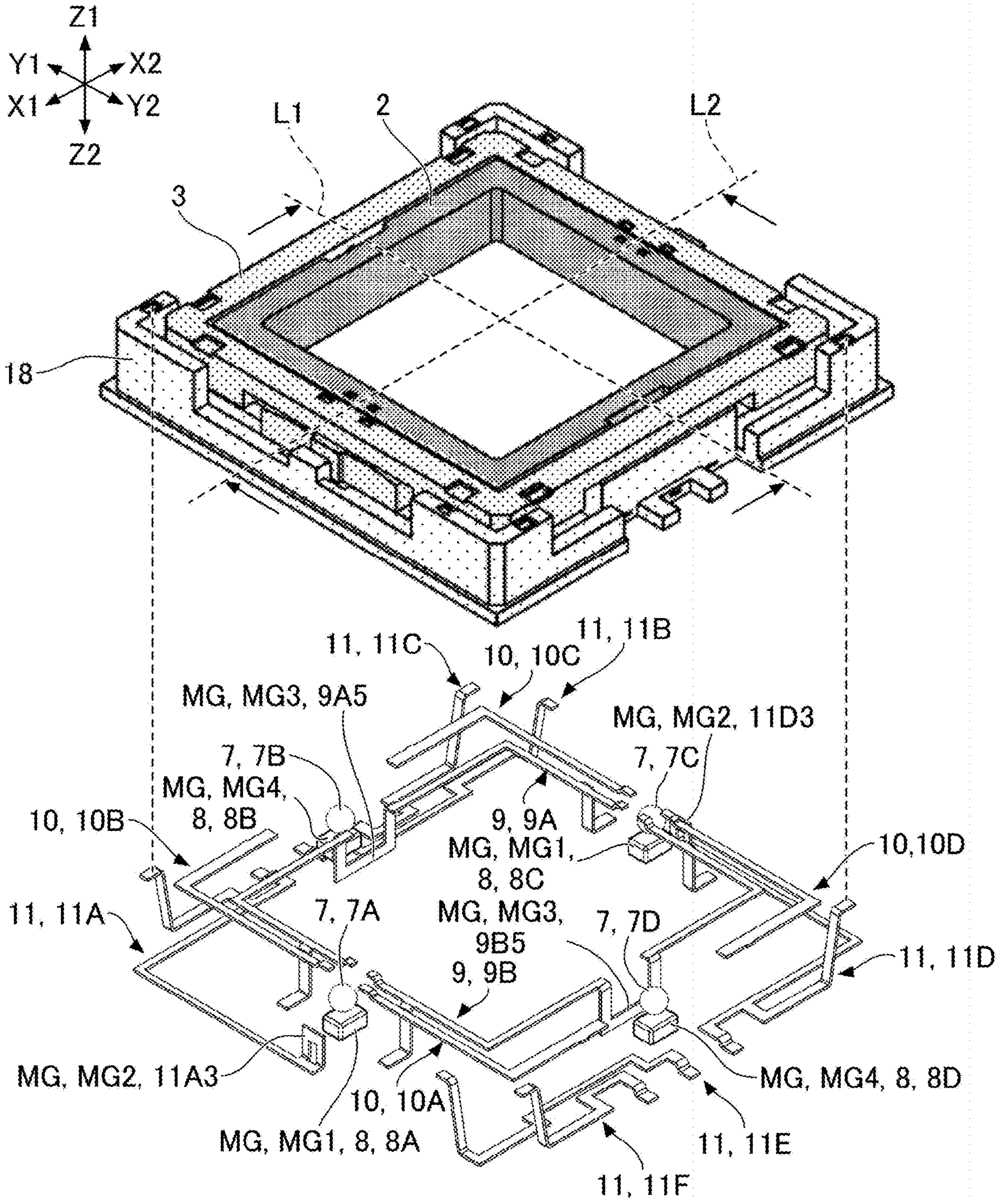
FIG. 17 is a perspective view of the module holder, the connection member, the spherical body, the magnet, the inner conductive member, the central conductive member, the outer conductive member, and the base member.
Figure 18:
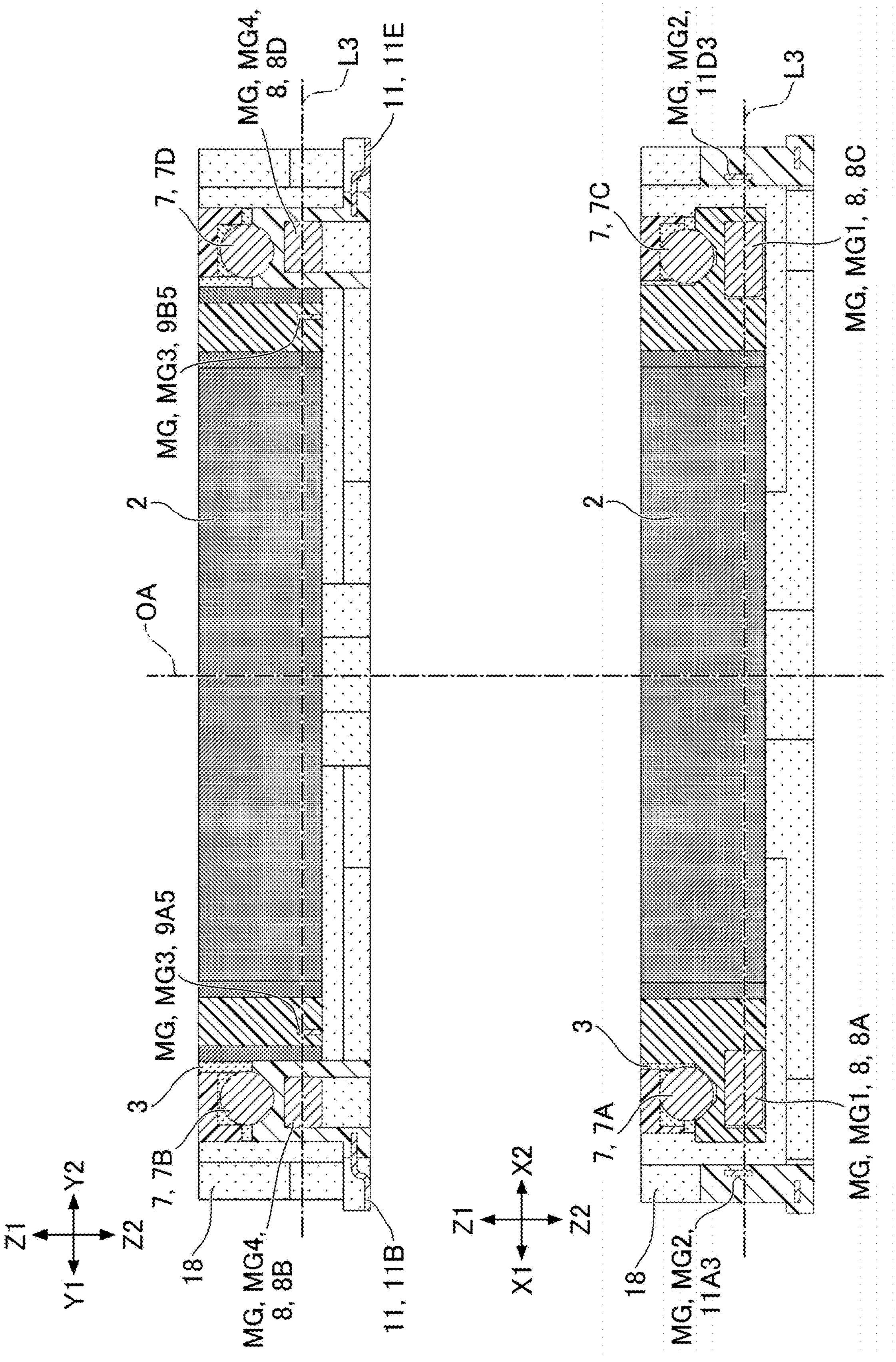
FIG. 18 is a vertical cross-sectional view of the module holder, the connection member, the spherical body, the magnet, the inner conductive member, the outer conductive member, and the base member.
Figure 19:
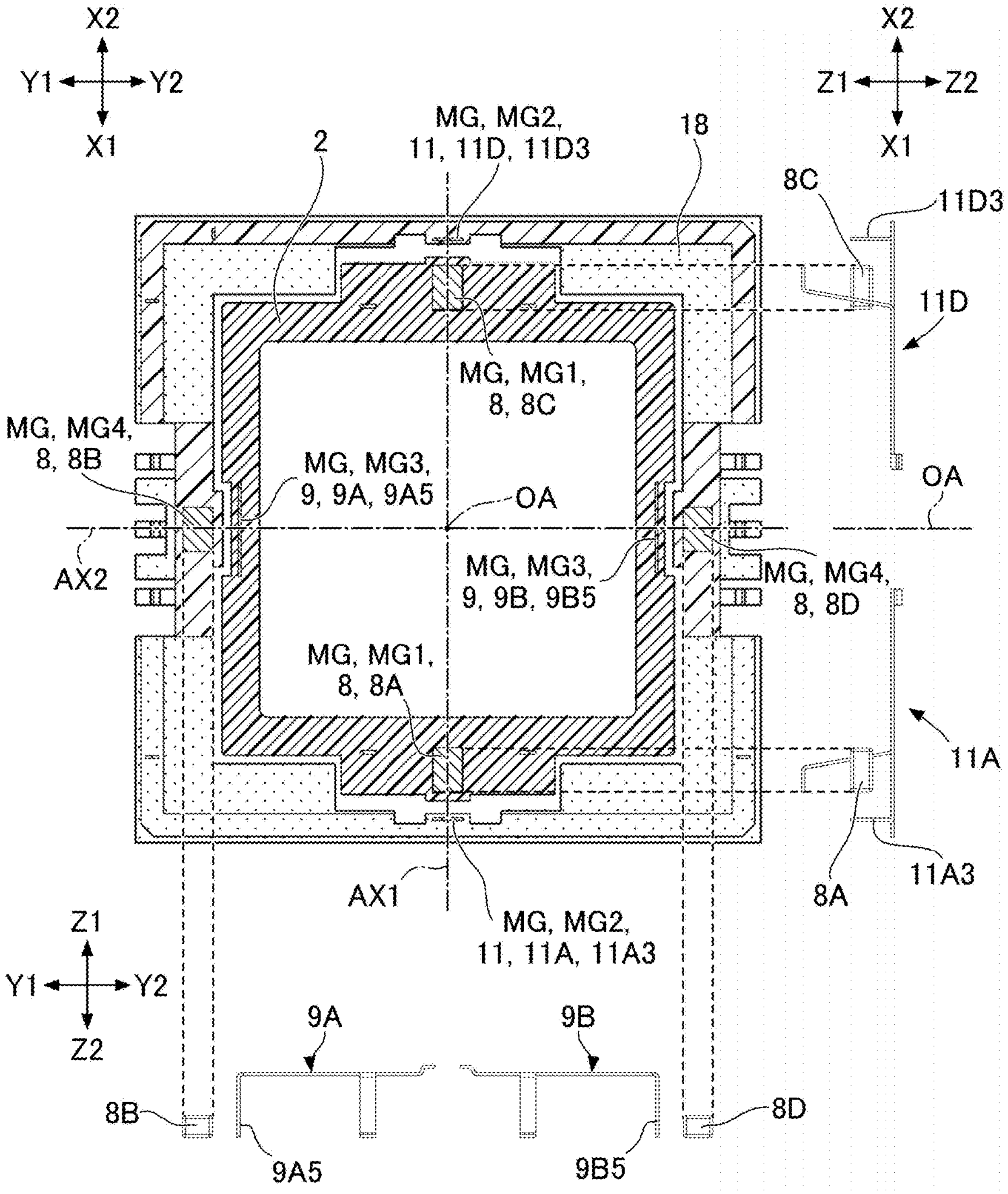
FIG. 19 is a view of the module holder, the magnet, the inner conductive member, the outer conductive member, and the base member.

Next, details of the magnetic member MG will be described with reference to FIGS. 17 to 19. FIG. 17 is a perspective view of the module holder 2, the connection member 3, the spherical body 7, the magnet 8, the inner conductive member 9, the central conductive member 10, the outer conductive member 11, and the base member 18. Specifically, the upper view in FIG. 17 is a perspective view of the module holder 2, the connection member 3, and the base member 18, and in the upper view in FIG. 17, the spherical body 7, the magnet 8, the inner conductive member 9, the central conductive member 10, and the outer conductive member 11 cannot be seen due to the presence of the module holder 2, the connection member 3, and the base member 18. The lower view in FIG. 17 is a perspective view of the spherical body 7, the magnet 8, the inner conductive member 9, the central conductive member 10, and the outer conductive member 11, and in the lower view in FIG. 17, illustration of the module holder 2, the connection member 3, and the base member 18 is omitted. FIG. 18 is a vertical cross-sectional view of the module holder 2, the connection member 3, the spherical body 7, the magnet 8, the inner conductive member 9, the central conductive member 10, the outer conductive member 11, and the base member 18. Specifically, the upper view in FIG. 18 illustrates a cross section of the module holder 2, the connection member 3, the spherical body 7, the magnet 8, the inner conductive member 9, the outer conductive member 11, and the base member 18 at a plane cut parallel to a YZ plane including a line segment L1 in the upper view in FIG. 17. The lower view in FIG. 18 illustrates a cross section of the module holder 2, the connection member 3, the spherical body 7, the magnet 8, the outer conductive member 11, and the base member 18 at a plane cut parallel to an XZ plane including a line segment L2 in the upper view in FIG. 17. Therefore, the central conductive member 10 is not illustrated in the upper and lower views in FIG. 18. FIG. 19 is a view of the module holder 2, the magnet 8, the inner conductive member 9, the outer conductive member 11, and the base member 18. Specifically, FIG. 19 includes: a horizontal cross-sectional view of the module holder 2, the magnet 8, the inner conductive member 9, the outer conductive member 11, and the base member 18 at a plane cut parallel to the XY plane including a line segment L3 in FIG. 18; a front view of the second magnet 8B, the fourth magnet 8D, the first inner conductive member 9A, and the second inner conductive member 9B; and a right side view of the first magnet 8A, the third magnet 8C, the first outer conductive member 11A, and the fourth outer conductive member 11D.

As illustrated in the lower view in FIG. 17, the magnetic member MG includes the first magnetic member MG1 to the fourth magnetic member MG4. The first magnetic member MG1 and the second magnetic member MG2, which are movable relative to each other, are disposed so as to be attracted to face each other by the action of a magnetic attractive force, in the initial state of the module driving device MD in which the driver DM is not driven. The initial state of the module driving device MD may be, for example, a state of the module driving device MD in which no current is supplied to the shape memory alloy wires SA, or may be the neutral state of the module driving device MD (e.g., a state in which the module holder 2 is positioned at the center of the range rotatable about each of the three axes, i.e., the X axis, the Y axis, and the Z axis). The same applies to a combination of the third magnetic member MG3 and the fourth magnetic member MG4, which are movable relative to each other.

In the illustrated example, the first magnetic member MG1 includes the first magnet 8A and the third magnet 8C, and is fixed to the module holder 2. The second magnetic member MG2 includes the third portion 11A3 of the first outer conductive member 11A formed of a magnetic metal and the third portion 11D3 of the fourth outer conductive member 11D formed of a magnetic metal, and is embedded in the base member 18. In the initial state of the module driving device MD, the first magnet 8A and the third portion 11A3 of the first outer conductive member 11A, which are movable relative to each other, are attracted to each other by a magnetic attractive force acting in a direction along the axial line of the first axial line AX1, and are disposed so as to face each other in a front-rear direction (X-axis direction). In the initial state of the module driving device MD, the third magnet 8C and the third portion 11D3 of the fourth outer conductive member 11D, which are movable relative to each other, are attracted to each other by a magnetic attractive force acting in the direction along the axial line of the first axial line AX1, and are disposed so as to face each other in the front-rear direction (X-axis direction).

In a cross-sectional plan view as illustrated in FIG. 19, the first axial line AX1 is disposed so as to pass through the center of each of the first magnetic member MG1 and the second magnetic member MG2 in the initial state of the module driving device MD. However, the first axial line AX1 may be disposed so as to pass through at least a part of each of the first magnetic member MG1 and the second magnetic member MG2 in the initial state of the module driving device MD.

The third magnetic member MG3 includes the fifth portion 9A5 of the first inner conductive member 9A formed of a magnetic metal and the fifth portion 9B5 of the second inner conductive member 9B formed of a magnetic metal, and is embedded in the module holder 2. The fourth magnetic member MG4 includes the second magnet 8B and the fourth magnet 8D, and is fixed to the base member 18. In the initial state of the module driving device MD, the second magnet 8B and the fifth portion 9A5 of the first inner conductive member 9A, which are movable relative to each other, are attracted to each other by a magnetic attractive force acting in a direction along the axial line of the second axial line AX2, and are disposed so as to face each other in the right-left direction (Y-axis direction). In the initial state of the module driving device MD, the fourth magnet 8D and the fifth portion 9B5 of the second inner conductive member 9B, which are movable relative to each other, are attracted to each other by a magnetic attractive force acting in the direction along the axial line of the second axial line AX2, and are disposed so as to face each other in the right-left direction (Y-axis direction).

In the cross-sectional plan view as illustrated in FIG. 19, the second axial line AX2 is disposed so as to pass through the center of each of the third magnetic member MG3 and the fourth magnetic member MG4 in the initial state of the module driving device MD. However, the second axial line AX2 may be disposed so as to pass through at least a part of each of the third magnetic member MG3 and the fourth magnetic member MG4 in the initial state of the module driving device MD.

With this configuration, in the initial state of the module driving device MD, the magnetic member MG can move the movable-side member MB (the module holder 2 and the connection member 3) to the neutral position, suppress the rotation of the movable-side member MB relative to the fixed-side member FB, and maintain the posture of the movable-side member MB.

The spherical body 7 and the magnet 8, which are movable relative to each other, are disposed so as to face each other in the vertical direction (Z-axis direction) and so as to be attracted to each other by the action of a magnetic attractive force. In the illustrated example, the first spherical body 7A formed of a magnetic metal and the first magnet 8A are disposed so as to face each other in the vertical direction (Z-axis direction) and so as to be attracted to each other by the action of a magnetic attractive force. The same applies to a combination of the second spherical body 7B formed of a magnetic metal and the second magnet 8B, a combination of the third spherical body 7C formed of a magnetic metal and the third magnet 8C, and a combination of the fourth spherical body 7D formed of a magnetic metal and the fourth magnet 8D.

With this configuration, the first spherical body 7A and the third spherical body 7C, fixed to the connection member 3, and the first magnet 8A and the third magnet 8C, fixed to the module holder 2, can attract the module holder 2 and the connection member 3 to each other by the action of a magnetic attractive force, thereby suppressing separation between the module holder 2 and the connection member 3 that are connected via the first spherical body 7A and the third spherical body 7C. The second spherical body 7B and the fourth spherical body 7D, fixed to the connection member 3, and the second magnet 8B and the fourth magnet 8D, fixed to the base member 18, can attract the connection member 3 and the base member 18 to each other by the action of a magnetic attractive force, thereby suppressing separation between the connection member 3 and the base member 18 that are connected via the second spherical body 7B and the fourth spherical body 7D.

Figure 20:
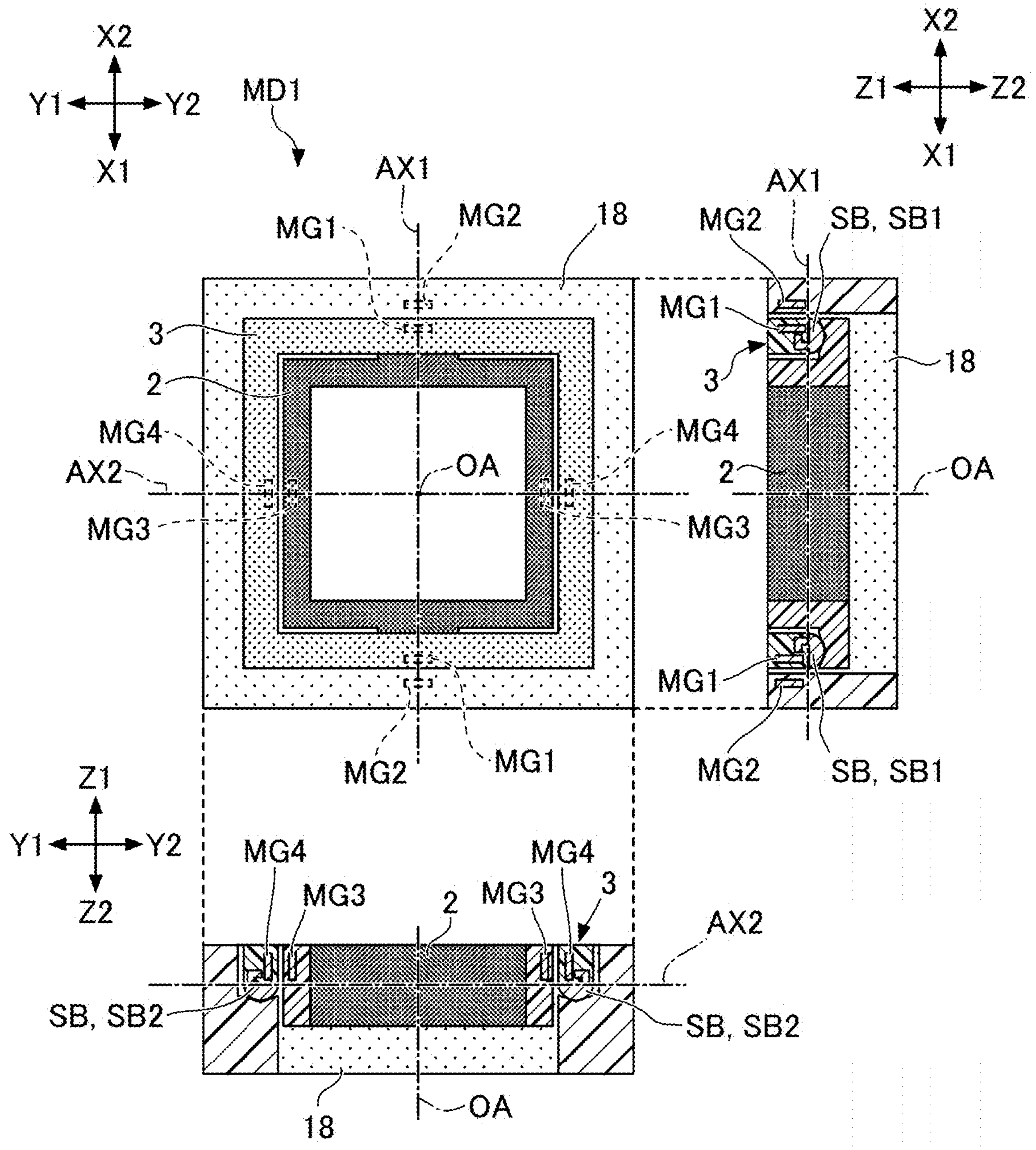
FIG. 20 is a cross-sectional view of a module holder, a connection member, a base member, and a magnetic member that form another embodiment of the present disclosure.

Next, a module driving device MD1 that is another configuration example of the module driving device MD will be described with reference to FIG. 20. FIG. 20 is a cross-sectional view of the module holder 2, the connection member 3, the base member 18, and the magnetic member MG in the module driving device MD1.

According to the module driving device MD1, the first magnetic member MG1 and the fourth magnetic member MG4 are fixed to the connection member 3. In terms of this point, the module driving device MD1 is different from the module driving device MD, in which the first magnetic member MG1 is fixed to the module holder 2 and the fourth magnetic member MG4 is fixed to the base member 18.

According to the module driving device MD, as illustrated in FIG. 19, magnets 8 (the first magnetic member MG1 and the fourth magnetic member MG4) are fixed to the module holder 2 and the base member 18, and magnetic metals (the second magnetic member MG2 and the third magnetic member MG3) are fixed to the module holder 2 and the base member 18. Meanwhile, according to the module driving device MD1, as illustrated in FIG. 20, magnets (the first magnetic member MG1 and the fourth magnetic member MG4) are fixed to the connection member 3, and magnetic metals (the second magnetic member MG2 and the third magnetic member MG3) are fixed to the base member 18 and the module holder 2. However, in any of the module driving device MD and the module driving device MD1, at least one of the first magnetic member MG1 or the second magnetic member MG2 facing each other may be a magnet. The same applies to the third magnetic member MG3 and the fourth magnetic member MG4 facing each other.

Alternatively, the first magnetic member MG1 may be fixed to the base member 18 rather than the connection member 3. In this case, the second magnetic member MG2 may be fixed to the connection member 3 rather than the base member 18. Alternatively, the third magnetic member MG3 may be fixed to the connection member 3 rather than the module holder 2. In this case, the fourth magnetic member MG4 may be fixed to the module holder 2 rather than the connection member 3. Alternatively, the third magnetic member MG3 may be fixed to the base member 18. In this case, the fourth magnetic member MG4 may be fixed to the module holder 2. Alternatively, the third magnetic member MG3 may be fixed to the module holder 2, and the fourth magnetic member MG4 may be fixed to both of the connection member 3 and the base member 18. Alternatively, the first magnetic member MG1 may be fixed to both of the module holder 2 and the connection member 3, and the second magnetic member MG2 may be fixed to the base member 18.

Also, according to the module driving device MD1, the support SB that is a magnetic metal containing a hemispherical portion is embedded in the connection member 3. In terms of this point, the module driving device MD1 is different from the module driving device MD in which the support SB formed by the spherical body 7 is adhesively fixed to the connection member 3. In the example illustrated in FIG. 20, the support SB includes a portion embedded in the connection member 3 and a hemispherical portion exposed to the lower surface of the connection member 3.

Although the module driving device MD1 has such a configurational difference, the module driving device MD1 can achieve the same effects as those achieved by the module driving device MD. That is, according to the module driving device MD1, similarly, the magnetic member MG can move the movable-side member MB (the module holder 2 and the connection member 3) to the neutral position in the initial state of the module driving device MD1, suppress the rotation of the movable-side member MB relative to the fixed-side member FB, and maintain the posture of the movable-side member MB. Further, the first support SB1 can achieve the rotation (rocking) of the module holder 2 about the first axial line AX1 relative to the connection member 3, and the rotation of the module holder 2 about the optical axis OA relative to the connection member 3. Similarly, the second support SB2 can achieve the rotation (rocking) of the connection member 3 about the second axial line AX2 relative to the base member 18, and the rotation of the connection member 3 about the optical axis OA relative to the base member 18.

As described above, the module driving device MD according to the embodiment of the present disclosure includes, as illustrated in FIG. 2: the module holder 2 configured to hold the optical module OM including the lens body LS and the imaging element IS; the connection member 3 connected to the module holder 2 such that the module holder 2 is rockable about the first axial line AX1 crossing the optical-axis direction; the fixed-side member FB (the base member 18) connected to the connection member 3 such that the connection member 3 is rockable about the second axial line AX2 crossing the optical-axis direction and being perpendicular to the axial line direction of the first axial line AX1; and the driver DM including a plurality of shape memory alloy wires SA configured to move the module holder 2 relative to the fixed-side member FB. As illustrated in FIG. 3, the first movable portion MB1 including the module holder 2 includes a third magnetic member MG3, and at least one of the second movable portion MB2, which includes the connection member 3, or the fixed-side member FB includes the fourth magnetic member MG4. At least one of the third magnetic member MG3 or the fourth magnetic member MG4 (the fourth magnetic member MG4) is formed of the magnet 8 (the second magnet 8B and the fourth magnet 8D). Due to a magnetic force (attractive force) acting between the third magnetic member MG3 and the fourth magnetic member MG4, the rocking of the module holder 2 about the first axial line AX1 is suppressed and the posture of the module holder 2 is maintained, in the initial state in which the driver DM is not driven. Also, the movable-side member MB including the first movable portion MB1 and the second movable portion MB2 includes the first magnetic member MG1, and the fixed-side member FB includes the second magnetic member MG2. At least one of the first magnetic member MG1 or the second magnetic member MG2 (the first magnetic member MG1) is formed of the magnet 8 (the first magnet 8A and the third magnet 8C). Due to a magnetic force (attractive force) acting between the first magnetic member MG1 and the second magnetic member MG2, the rocking of the connection member 3 about the second axial line AX2 is suppressed and the posture of the connection member 3 is maintained in the initial state.

This configuration can maintain the posture of the module holder 2 in the initial state in which the driver DM is not driven. Thus, when shooting motion pictures and the like in the initial state or a state close to the initial state, it is possible to reduce a current to be supplied to the shape memory alloy wires SA forming the driver DM, and to provide the effect of power saving.

Also, as illustrated in FIG. 19, the first magnetic member MG1 and the second magnetic member MG2 may be positioned on the axial line of the first axial line AX1 in a cross-sectional plan view that is along the optical-axis direction. In this case, the first magnetic member MG1 and the second magnetic member MG2 may be disposed apart from each other in the axial line direction of the first axial line AX1 in a state in which a magnetic force to attract the first and second magnetic members MG1 and MG2 to each other is acting.

This configuration provides the effect of being able to appropriately suppress the rocking of the module holder 2 and the connection member 3 about the second axial line AX2 in the initial state of the module driving device MD.

Further, as illustrated in FIG. 19, the first magnetic member MG1 and the second magnetic member MG2 may be disposed as a pair at positions apart from each other (positions facing each other) in the axial line direction of the first axial line AX1 across the optical axis OA.

This configuration provides the effect of being able to more reliably hold the movable-side member MB (the module holder 2 and the connection member 3) in the initial state of the module driving device MD.

The first magnetic member MG1 may be formed of the magnet 8 (the first magnet 8A and the third magnet 8C). In this case, the second magnetic member MG2 may be formed of the magnetic metals (the third portion 11A3 of the first outer conductive member 11A and the third portion 11D3 of the fourth outer conductive member 11D) provided at the base member 18 forming the fixed-side member FB, and may be disposed outward of the first magnetic member MG1 (farther from the optical axis).

This configuration provides the effect of being able to achieve a simple configuration and suppress an increase in the number of magnets.

Also, as illustrated in FIG. 3, the module holder 2 and the connection member 3 may be connected so as to partially overlap with each other in the optical-axis direction via the two first supports SB1 that are disposed so as to face each other across the optical axis OA in the axial line direction of the first axial line AX1. In this case, the first magnetic member MG1 may be formed of the magnet 8 (the first magnet 8A and the third magnet 8C) and the first support SB1 (the first spherical body 7A and the third spherical body 7C) may be formed of a magnetic material. The first magnetic member MG1 and the first support SB1 may be disposed so as to attract each other in the optical-axis direction. For example, as illustrated in the lower view in FIG. 18, the first spherical body 7A and the third spherical body 7C forming the first support SB1 are formed of a magnetic material. The first magnet 8A forming the first magnetic member MG1 and the first spherical body 7A forming the first support SB1 are disposed so as to attract each other in the optical-axis direction. The same applies to a combination of the third spherical body 7C and the third magnet 8C.

This configuration provides the effect of being able to stabilize the connection between the module holder 2 and the connection member 3 via the spherical body 7 (the first spherical body 7A and the third spherical body 7C) serving as the first support SB1 by using the magnet 8 (the first magnet 8A and the third magnet 8C) serving as the first magnetic member MG1 used for holding the movable-side member MB in the initial state of the module driving device MD. In the illustrated example, the spherical body 7 is formed of a magnetic metal, and adhesively fixed to the connection member 3. The magnet 8 is a bipolar magnet having different magnetic poles in the vertical direction (Z-axis direction). This configuration provides the effect of being able to more reliably achieve attraction of the spherical body 7 by the magnet 8.

Also, the module holder 2 may include the support-mounting portion 2M disposed below the connection member 3. In this case, as illustrated in the lower view in FIG. 4, the first magnetic member MG1 (the first magnet 8A and the third magnet 8C) may be disposed in the magnet-housing portion 2S, serving as a magnet-mounting portion, formed at the lower surface (lower side) of the support-mounting portion 2M, and the first support SB1 may be disposed on the support-mounting portion 2M, as illustrated in the upper view in FIG. 4. The magnet-housing portion does not necessarily need to have a recess formed therein.

This configuration provides the effect of being able to make the module driving device MD thin. In this configuration, the first support SB1 formed of a magnetic material (the first spherical body 7A and the third spherical body 7C) and the first magnetic member MG1 (the first magnet 8A and the third magnet 8C) fixed to the module holder 2 are attracted to each other. Thus, this configuration provides the effect of being able to stabilize the contact between the first support SB1 (the first spherical body 7A and the third spherical body 7C) and the module holder 2.

Also, as illustrated in FIG. 19, the third magnetic member MG3 and the fourth magnetic member MG4 may be positioned on the axial line of the second axial line AX2 in a cross-sectional plan view that is along the optical-axis direction. In this case, the third magnetic member MG3 and the fourth magnetic member MG4 may be disposed apart from each other in the axial line direction of the second axial line AX2 in a state in which a magnetic force to attract the third and fourth magnetic members MG3 and MG4 to each other is acting.

This configuration provides the effect of being able to appropriately suppress the rocking of the module holder 2 about the first axial line AX1 in the initial state of the module driving device MD.

Also, as illustrated in FIG. 19, the third magnetic member MG3 and the fourth magnetic member MG4 may be disposed as a pair at positions apart from each other in the axial line direction of the second axial line AX2 across the optical axis OA.

This configuration provides the effect of being able to more reliably hold the movable-side member MB (the module holder 2 and the connection member 3) in the initial state of the module driving device MD.

The fourth magnetic member MG4 may be formed of the magnet 8 (the second magnet 8B and the fourth magnet 8D). In this case, the third magnetic member MG3 may be formed of the metal provided on the module holder 2 (the fifth portion 9A5 of the first inner conductive member 9A and the fifth portion 9B5 of the second inner conductive member 9B) and may be disposed inward of the fourth magnetic member MG4 (closer to the optical axis).

This configuration provides the effect of being able to achieve a simple configuration and suppress an increase in the number of magnets.

Also, as illustrated in FIG. 3, the fixed-side member FB (the base member 18) and the connection member 3 may be connected so as to overlap with each other in the optical-axis direction via the two second supports SB2 (the second spherical body 7B and the fourth spherical body 7D) that are disposed so as to face each other across the optical axis OA in the axial line direction of the second axial line AX2. In this case, the fourth magnetic member MG4 may be formed of the magnet (the second magnet 8B and the fourth magnet 8D) and the second support SB2 may be formed of a magnetic material. The fourth magnetic member MG4 and the second support SB2 may be disposed so as to attract each other in the optical-axis direction.

This configuration provides the effect of being able to stabilize the connection between the connection member 3 and the fixed-side member FB (the base member 18) via the spherical body 7 (the second spherical body 7B and the fourth spherical body 7D) serving as the second support SB2 by using the magnet 8 (the second magnet 8B and the fourth magnet 8D) serving as the fourth magnetic member MG4 used for holding the movable-side member MB in the initial state of the module driving device MD.

Also, the base member 18 forming the fixed-side member FB may include the support-mounting portion 18M. In this case, as illustrated in the lower view in FIG. 6, the fourth magnetic member MG4 (the second magnet 8B and the fourth magnet 8D) may be disposed in the magnet-housing portion 18S, serving as a magnet-mounting portion, formed at the lower surface (lower side) of the support-mounting portion 18M, and the second support SB2 (the second spherical body 7B and the fourth spherical body 7D) may be disposed on the support-mounting portion 18M, as illustrated in the upper view in FIG. 6. The magnet-housing portion does not necessarily need to have a recess formed therein.

In this configuration, the second support SB2 formed of a magnetic material (the second spherical body 7B and the fourth spherical body 7D) and the fourth magnetic member MG4 (the second magnet 8B and the fourth magnet 8D) fixed to the fixed-side member FB (the base member 18) are attracted to each other. Thus, this configuration provides the effect of being able to stabilize the contact between the second support SB2 (the second spherical body 7B and the fourth spherical body 7D) and the fixed-side member FB (the base member 18).

Also, the module driving device MD may include a plurality of first shape memory alloy wires (the first wire SA1 to the fourth wire SA4) provided between the first movable portion MB1 (the module holder 2) and the second movable portion MB2 (the connection member 3), and a plurality of second shape memory alloy wires (the fifth wire SA5 to the eighth wire SA8) provided between the second movable portion MB2 (the connection member 3) and the fixed-side member FB (the base member 18).

This configuration provides the effect of being able to increase the degree of freedom of movement of the module holder 2.

According to the module driving device MD according to the embodiment of the present disclosure, as illustrated in FIG. 3, the two first supports SB1 (the first spherical body 7A and the third spherical body 7C), which are disposed so as to face each other across the optical axis OA in the axial line direction of the first axial line AX1, may be fixed to a first member (the connection member 3) that is one of the module holder 2 or the connection member 3. In this case, at least a surface (lower surface) of the first support SB1 may be formed as a projecting curved surface, the surface being a surface facing a second member (the module holder 2) that is the other of the module holder 2 or the connection member 3, and the first support SB1 may be formed of a metal or ceramic. The module holder 2 and the connection member 3 may be disposed so as to partially overlap with each other in the optical-axis direction via the two first supports SB1.

In this configuration, the first support SB1 is formed of a metal or ceramic. Thus, this configuration provides the effect of being able to suppress the generation of wear particles caused by the contact between the first support SB1 and the second member compared to a case in which the first support SB1 is formed of a synthetic resin. In the present embodiment, the module holder 2 and the connection member 3 are connected such that the module holder 2 is rockable about the first axial line AX1 via the two first supports SB1.

Also, as illustrated in FIG. 3, the two second supports SB2 (the second spherical body 7B and the fourth spherical body 7D), which are disposed so as to face each other across the optical axis OA in the axial line direction of the second axial line AX2, may be fixed to a third member that is one of the connection member 3 or the fixed-side member FB (the base member 18). In this case, at least a surface (lower surface) of the second support SB2 may be formed as a projecting curved surface, the surface being a surface facing a fourth member (the base member 18) that is the other of the connection member 3 or the fixed-side member FB, and the second support SB2 may be formed of a metal or ceramic. The connection member 3 and the fixed-side member FB (the base member 18) may be disposed so as to overlap with each other in the optical-axis direction via the two second supports SB2.

In this configuration, the second support SB2 is formed of a metal or ceramic. Thus, this configuration provides the effect of being able to suppress the generation of wear particles caused by the contact between the second support SB2 and the fourth member compared to a case in which the second support SB2 is formed of a synthetic resin. In the present embodiment, the connection member 3 is connected to and supported by the fixed-side member FB (the base member 18) such that the connection member 3 is rockable about the second axial line AX2 via the two second supports SB2.

Each of the first support SB1 and the second support SB2 may be formed by the spherical body 7 that is formed of a metal.

This configuration provides the effect of readily increasing the sphericity of the spherical body 7 compared to a case of forming the spherical body 7 of a non-metallic material. Therefore, this configuration provides the effect of being able to enhance the stability of movement of the movable-side member MB relative to the fixed-side member FB. Also, this configuration provides the effect of readily increasing durability compared to a case in which the spherical body is formed of a non-metallic material. Also, this configuration provides the effect of being able to increase productivity (assemblability) of the module driving device MD. This is because, unlike in a case of a non-spherical shape, it is not necessary to pay attention to the orientation in assembling.

Further, the module holder 2 may include the support-mounting portion 2M disposed on the lower side of the connection member 3. In this case, the first support SB1 may be disposed on the upper side (subject side) of the support-mounting portion 2M, and the first support SB1 and the second support SB2 may be fixed on the lower side (lower surface side) of the connection member 3.

This configuration provides, for example, the effect of being able to reduce the height dimension of the module driving device MD in the optical-axis direction compared to a case in which the entire module holder 2 is disposed at a position higher than the connection member 3 in the optical-axis direction. Also, this configuration provides the effect of being able to increase productivity (assemblability) of the module driving device MD. This is because the first support SB1 and the second support SB2 are fixed to the same member (the connection member 3).

The first support SB1 and the second support SB2 may be formed of a magnetic material. In this case, as illustrated in the upper view in FIG. 4, the second member (the module holder 2), which is the other of the module holder 2 or the connection member 3, may include the magnet 8 (the first magnet 8A and the third magnet 8C) configured to exert an attractive force between the second member and the first support SB1, and the magnet 8 may be fixed at a position apart from the first support SB1 in the optical-axis direction. Also, as illustrated in the upper view in FIG. 6, the fourth member (the base member 18), which is the other of the connection member 3 or the fixed-side member FB (the base member 18), may include the magnet 8 (the second magnet 8B and the fourth magnet 8D) configured to exert an attractive force between the fourth member and the second support SB2, and the magnet 8 may be fixed at a position apart from the second support SB2 in the optical-axis direction.

This configuration provides the effect of being able to more reliably achieve the contact between the first support SB1 and the second member and the contact between the second support SB2 and the fourth member, and further stabilize the rocking motion of the movable-side member MB.

Also, as illustrated in FIG. 15, the module holder 2 and the connection member 3 may be configured so as to be rotatable about the optical axis OA relative to each other. As illustrated in the upper view of FIG. 15, the second member (the module holder 2), which is the other of the module holder 2 or the connection member 3, may include a first groove (the recess 2R) that has an arc shape (partially annular shape) in a plan view. The first support SB1 (the first spherical body 7A and the third spherical body 7C) may slide on the first groove (the recess 2R) during relative rotation. Additionally or alternatively, the connection member 3 and the fixed-side member FB (the base member 18) may be configured so as to be rotatable about the optical axis OA relative to each other. The fourth member (the base member 18), which is the other of the connection member 3 or the fixed-side member FB (the base member 18), may include a second groove (the recess 18R) that is arc-shaped (partially annular) in a plan view. The second support SB2 (the second spherical body 7B and the fourth spherical body 7D) may slide on the second groove (the recess 18R) during relative rotation.

This configuration provides the effect of being able to achieve, as image stabilization, not only pitching correction and yawing correction but also rotation correction about the optical axis OA (rolling correction).

The driver DM (the plurality of shape memory alloy wires SA) may include: the plurality of first shape memory alloy wires (the first wire SA1 to the fourth wire SA4) provided between the first movable portion MB1 including the module holder 2 and the second movable portion MB2 including the connection member 3; and the plurality of second shape memory alloy wires (the fifth wire SA5 to the eighth wire SA8) provided between the second movable portion MB2 and the fixed-side member FB (the base member 18). In this case, as illustrated in the top view in FIG. 7, the first shape memory alloy wires (the first wire SA1 to the fourth wire SA4) may be disposed such that a straight line SL passing through one end and the other end of the first shape memory alloy wires (the first wire SA1 to the fourth wire SA4) is substantially parallel to the second axial line AX2 (substantially perpendicular to the first axial line AX1) as viewed along the optical-axis direction. Also, as illustrated in the upper view in FIG. 8, the second shape memory alloy wires (the fifth wire SA5 to the eighth wire SA8) may be disposed such that a straight line SL passing through one end and the other end of the second shape memory alloy wires (the fifth wire SA5 to the eighth wire SA8) is substantially parallel to the first axial line AX1 (substantially perpendicular to the second axial line AX2) as viewed along the optical-axis direction. As illustrated in the front view in FIG. 7 and the right side view in FIG. 8, the one end and the other end of the first shape memory alloy wires (the first wire SA1 to the fourth wire SA4) or the one end and the other end of the second shape memory alloy wires (the fifth wire SA5 to the eighth wire SA8) may be at positions different in the optical-axis direction. That is, the height of the one end and the height of the other end may be different. The axial lines AX (the first axial line AX1 and the second axial line AX2) may pass through the center of the spherical body 7 and may be present between the one end and the other end of the shape memory alloy wires (the first wire SA1 to the eighth wire SA8) in the optical-axis direction.

In the illustrated example, the first axial line AX1 and the second axial line AX2 are at the same height position in the optical-axis direction, i.e., in the same plane. However, the first axial line AX1 and the second axial line AX2 do not necessarily need to be in the same plane. Desirably, the first axial line AX1 and the second axial line AX2 are at the same height position in the optical-axis direction.

The configuration in which the first axial line AX1 and the second axial line AX2 are at the same height position in the optical-axis direction provides the effect of being able to increase the degree of freedom of movement of the module holder 2 compared to the configuration in which the first axial line AX1 and the second axial line AX2 are at different height positions in the optical-axis direction. This is because the center point of rotation (rocking) about the first axial line AX1 is the same as the center point of rotation (rocking) about the second axial line AX2.

The configuration in which the one end and the other end of the shape memory alloy wires SA are at different height positions in the optical-axis direction provides the effect of being able to increase the amount of rocking (angle of rocking) of the module holder 2 compared to the configuration in which the one end and the other end of the shape memory alloy wires SA are at the same height position in the optical-axis direction. Even if the distance between a projected point of the one end of the shape memory alloy wires SA and a projected point of the other end of the shape memory alloy wires SA in the plane parallel to the XY plane is the same, the length (distance between the one end and the other end) of the shape memory alloy wires SA is longer in the configuration in which the one end and the other end are at different height positions in the optical-axis direction than in the configuration in which the one end and the other end are at the same height position in the optical-axis direction.

Also, as illustrated in the front view in FIG. 7, the one end and the other end of the first shape memory alloy wires (the first wire SA1 to the fourth wire SA4) may be positioned on different sides of a first imaginary plane PL1 that is perpendicular to the second axial line AX2 and includes the first axial line AX1. Further, as illustrated in the right side view in FIG. 8, the one end and the other end of the second shape memory alloy wires (the fifth wire SA5 to the eighth wire SA8) may be positioned on different sides of a second imaginary plane PL2 that is perpendicular to the first axial line AX1 and includes the second axial line AX2. In the illustrated example, the one end of the first wire SA1 is positioned on the right side (Y2 side) of the first imaginary plane PL1, and the other end of the first wire SA1 is positioned on the left side (Y1 side) of the first imaginary plane PL1, as illustrated in FIG. 7. Further, the one end of the fifth wire SA5 is positioned on the rear side (X2 side) of the second imaginary plane PL2, and the other end of the fifth wire SA5 is positioned on the front side (X1 side) of the second imaginary plane PL2, as illustrated in FIG. 8.

Also, as illustrated in the top view in FIG. 7, in a plan view along the optical-axis direction, one of the one end or the other end of the first shape memory alloy wires (the first wire SA1 to the fourth wire SA4) may be at a position that is near the first axial line AX1 and at which the distance between the first axial line AX1 and one of the one end or the other end of the first shape memory alloy wires (the first wire SA1 to the fourth wire SA4) is smaller than the distance between the first axial line AX1 and the other of the one end or the other end of the first shape memory alloy wires (the first wire SA1 to the fourth wire SA4). Further, as illustrated in the top view in FIG. 8, in a plan view along the optical-axis direction, one of the one end or the other end of the second shape memory alloy wires (the fifth wire SA5 to the eighth wire SA8) may be at a position that is near the second axial line AX2 and at which the distance between the second axial line AX2 and one of the one end or the other end of the second shape memory alloy wires (the fifth wire SA5 to the eighth wire SA8) is smaller than the distance between the second axial line AX2 and the other of the one end or the other end of the second shape memory alloy wires (the fifth wire SA5 to the eighth wire SA8). In the illustrated example, a distance DIR between the one end (right end) of the first wire SA1 in a plan view and the first axial line AX1 is smaller than a distance DIL between the other end (left end) of the first wire SAL in a plan view and the first axial line AX1, as illustrated in the top view in FIG. 7. Further, as illustrated in the top view in FIG. 8, a distance D5B between the one end (rear end) of the fifth wire SA5 in a plan view and the second axial line AX2 is smaller than a distance D5F between the other end (front end) of the fifth wire SA5 in a plan view and the second axial line AX2.

This configuration provides the effect of being able to rock the movable-side member MB even if an angle of θ between the axial line AX and the straight line SL passing through the one end and the other end of the shape memory alloy wires SA (see FIGS. 7 and 8) is large in a side view. Also, this configuration can increase the amount of rocking (angle of rocking) of the movable-side member MB (the module holder 2 and the connection member 3) even if the amount of shrinkage of the shape memory alloy wires SA caused by passage of a current is small. This is because the one end of the shape memory alloy wires SA is fixed at a position close to the axial line AX.

As illustrated in the front view in FIG. 7, of the first shape memory alloy wires (the first wire SA1 to the fourth wire SA4), the first wire SA1 and the second wire SA2 may be disposed so as to cross each other as viewed along the first axial line AX1. Also, a first crossing point NP1 between a straight line SL1 passing through the one end and the other end of the first wire SA1 and a straight line SL2 passing through the one end and the other end of the second wire SA2 may be at a position different from the first axial line AX1 as viewed along the first axial line AX1. As illustrated in the right side view in FIG. 8, of the second shape memory alloy wires (the fifth wire SA5 to the eighth wire SA8), a third wire (the fifth wire SA5) and a fourth wire (the sixth wire SA6) may be disposed so as to cross each other as viewed along the second axial line AX2. Also, a second crossing point NP2 between a straight line SL5 passing through the one end and the other end of the fifth wire SA5 and a straight line SL6 passing through the one end and the other end of the sixth wire SA6 may be at a position different from the second axial line AX2 as viewed along the second axial line AX2.

This configuration provides the effect of being able to reliably rock the movable-side member MB by passage of a current to the shape memory alloy wires SA.

Also, the first axial line AX1 may be on the upper side of the first crossing point NP1 as illustrated in the front view in FIG. 7, and the second axial line AX2 may be on the upper side of the second crossing point NP2 as illustrated in the right side view in FIG. 8.

This configuration provides the effect of being able to reduce the height dimension of the module driving device MD. Also, this configuration provides the effect of being able to avoid rotating (rocking) of the movable-side member MB in an undesired rotational (rocking) direction because a straight line connecting the rotation (rocking) center and the one end of the shape memory alloy wires SA can be prevented, in a side view, from coinciding with a straight line connecting the one end and the other end of the shape memory alloy wires SA.

The embodiments of the present invention have been described above in detail. However, the present invention is not limited to the above-described embodiments. Various modifications, substitutions, and the like are applicable to the above-described embodiments without departing from the scope of the present invention. Further, each of the features described with reference to the above-described embodiments may be appropriately combined unless there is any technical contradiction.

For example, in the above-described embodiments, the first shape memory alloy wires (the first wire SA1 to the fourth wire SA4) are disposed such that the straight line SL passing through the one end and the other end of the first shape memory alloy wires (the first wire SA1 to the fourth wire SA4) is substantially parallel to the second axial line AX2 (substantially perpendicular to the first axial line AX1) as viewed in a plan view along the optical-axis direction, as illustrated in the top view of FIG. 7. However, the first shape memory alloy wires may be disposed such that the straight line SL is substantially parallel to the first axial line AX1 (substantially perpendicular to the second axial line AX2) as viewed in a plan view along the optical-axis direction.

Also, in the above-described embodiments, the second shape memory alloy wires (the fifth wire SA5 to the eighth wire SA8) are disposed such that the straight line SL passing through the one end and the other end of the second shape memory alloy wires (the fifth wire SA5 to the eighth wire SA8) is substantially parallel to the first axial line AX1 (substantially perpendicular to the second axial line AX2) as viewed in a plan view along the optical-axis direction, as illustrated in the top view of FIG. 8. However, the second shape memory alloy wires may be disposed such that the straight line SL is substantially parallel to the second axial line AX2 (substantially perpendicular to the first axial line AX1) as viewed in a plan view along the optical-axis direction.

The module driving device described above can suppress power consumption.

What is claimed is:

1. A module driving device, comprising:
- a module holder configured to hold an optical module including a lens body and an imaging element;
- a connection member connected to the module holder such that the module holder is rockable about a first axial line that crosses a direction of an optical axis;
- a fixed-side member connected to the connection member such that the connection member is rockable about a second axial line that crosses the direction of the optical axis and is perpendicular to an axial line direction of the first axial line; and
- a driver including a plurality of shape memory alloy wires configured to move the module holder relative to the fixed-side member, wherein
- the module driving device includes a first magnetic member, a second magnetic member, a third magnetic member, and a fourth magnetic member,
- a first movable portion including the module holder includes the third magnetic member,
- at least one of a second movable portion or the fixed-side member includes the fourth magnetic member, the second movable portion including the connection member,
- at least one of the third magnetic member or the fourth magnetic member is formed of a magnet,
- due to a magnetic force acting between the third magnetic member and the fourth magnetic member, a posture of the module holder in an initial state in which the driver is not driven is maintained,
- a movable-side member includes the first magnetic member, the movable-side member including the first movable portion and the second movable portion,
- the fixed-side member includes the second magnetic member, at least one of the first magnetic member or the second magnetic member is formed of a magnet, and due to a magnetic force acting between the first magnetic member and the second magnetic member, a posture of the connection member in the initial state is maintained.

2. The module driving device according to claim 1, wherein the first magnetic member and the second magnetic member are positioned on an axial line of the first axial line in a plan view that is along the direction of the optical axis, and the first magnetic member and the second magnetic member are disposed apart from each other in an axial line direction of the first axial line in a state in which a magnetic force to attract the first magnetic member and the second magnetic member to each other is acting.

3. The module driving device according to claim 2, wherein the first magnetic member and the second magnetic member are disposed as a pair at positions apart from each other, in the axial line direction of the first axial line, across the optical axis.

4. The module driving device according to claim 3, wherein the first magnetic member is formed of a magnet, and the second magnetic member is formed of a magnetic metal provided at a base member forming the fixed-side member, and is disposed outward of the first magnetic member.

5. The module driving device according to claim 3, wherein the module holder and the connection member are connected so as to overlap with each other in the direction of the optical axis via two first supports that are disposed to face each other, in the axial line direction of the first axial line, across the optical axis, the first magnetic member is formed of a magnet, the two first supports are formed of a magnetic material, and the first magnetic member and the two first supports are disposed so as to attract each other in the direction of the optical axis.

6. The module driving device according to claim 5, wherein the module holder includes a support-mounting portion, the first magnetic member is disposed below the support-mounting portion, and the two first supports are disposed on the support-mounting portion.

7. The module driving device according to claim 1, wherein the third magnetic member and the fourth magnetic member are positioned on an axial line of the second axial line in a plan view that is along the direction of the optical axis, and the third magnetic member and the fourth magnetic member are disposed apart from each other in the axial line direction of the second axial line in a state in which a magnetic force to attract the third magnetic member and the fourth magnetic member to each other is acting.

8. The module driving device according to claim 7, wherein the third magnetic member and the fourth magnetic member are disposed as a pair at positions apart from each other, in an axial line direction of the second axial line, across the optical axis.

9. The module driving device according to claim 8, wherein the fourth magnetic member is formed of a magnet, and the third magnetic member is formed of a magnetic metal provided at the module holder, and is disposed inward of the fourth magnetic member.

10. The module driving device according to claim 8, wherein the fixed-side member and the connection member are connected so as to overlap with each other in the direction of the optical axis via two second supports that are disposed to face each other, in the axial line direction of the second axial line, across the optical axis, the fourth magnetic member is formed of a magnet, the two second supports are formed of a magnetic material, and the fourth magnetic member and the two second supports are disposed so as to attract each other in the direction of the optical axis.

11. The module driving device according to claim 10, wherein a base member that forms the fixed-side member includes a support-mounting portion, the fourth magnetic member is disposed below the support-mounting portion, and the two second supports are disposed on the support-mounting portion.

12. The module driving device according to claim 1, wherein the plurality of shape memory alloy wires included in the driver include a plurality of first shape memory alloy wires that are provided between the first movable portion and the second movable portion, and a plurality of second shape memory alloy wires that are provided between the second movable portion and the fixed-side member.

* * * * *